United States Patent
Olsen et al.

(10) Patent No.: US 9,389,703 B1
(45) Date of Patent: Jul. 12, 2016

(54) VIRTUAL SCREEN BEZEL

(71) Applicant: Amazon Technologies, Inc., Reno, NV (US)

(72) Inventors: Erik Jacob Olsen, Bellevue, WA (US); Robert Duane Rost, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 47 days.

(21) Appl. No.: 14/312,365

(22) Filed: Jun. 23, 2014

(51) Int. Cl.
*G06F 3/0346* (2013.01)
*G06F 3/0488* (2013.01)

(52) U.S. Cl.
CPC .......... *G06F 3/0346* (2013.01); *G06F 3/04886* (2013.01); *G06F 2200/1637* (2013.01); *G06F 2203/04803* (2013.01)

(58) Field of Classification Search
CPC ............ G06F 3/04883; G06F 3/04886; G06F 3/0488; G06F 3/0346; G06F 3/04815; G06F 3/0412; G06F 2203/04803; G06T 15/20; G06T 15/503; G06T 19/00; H04M 1/0268
See application file for complete search history.

(56) References Cited

U.S. PATENT DOCUMENTS

| | | | | |
|---|---|---|---|---|
| 5,579,036 A | * | 11/1996 | Yates, IV | G06F 3/044 178/18.06 |
| 6,337,698 B1 | * | 1/2002 | Keely, Jr. | G06F 3/0483 715/777 |
| 7,330,195 B2 | * | 2/2008 | Li | H04N 1/3871 345/629 |
| 7,428,001 B2 | * | 9/2008 | Schowengerdt | G02B 27/0093 345/6 |
| 8,089,778 B2 | * | 1/2012 | Wang | G06F 1/1626 361/737 |

(Continued)

*Primary Examiner* — Dwayne Bost
*Assistant Examiner* — Darlene M Ritchie
(74) *Attorney, Agent, or Firm* — Hogan Lovells US LLP

(57) ABSTRACT

Approaches enable a display screen to be configured to display content and/or receive touch-based input based on a location of regions of the display screen. For example, the display screen can include a virtual bezel region that extends along, or proximate to, the edges of the display screen. The virtual bezel region can surround a display region that is configured to display image content. By default the virtual bezel region may be configured to display no content, or at least no active content, in order to approximate the appearance of a physical bezel. The virtual bezel can be configured to exhibit characteristics similar to that of the physical bezel. For example, the virtual bezel region can be configured to operate as a 'dead zone', where touch-based input is deactivated. The virtual bezel region can also be configured to display a portion of any content displayed in the display region.

19 Claims, 14 Drawing Sheets

(56) References Cited

U.S. PATENT DOCUMENTS

| | | | | |
|---|---|---|---|---|
| 2004/0012572 A1* | 1/2004 | Sowden | G06F 3/03547 | 345/173 |
| 2005/0200611 A1* | 9/2005 | Goto | G06F 3/0488 | 345/173 |
| 2006/0238517 A1* | 10/2006 | King | G06F 1/1626 | 345/173 |
| 2009/0088204 A1* | 4/2009 | Culbert | G06F 3/017 | 455/556.1 |
| 2009/0219255 A1* | 9/2009 | Woolley | G06F 3/0416 | 345/173 |
| 2009/0243957 A1* | 10/2009 | Ni | G06F 3/04815 | 345/1.1 |
| 2010/0066763 A1* | 3/2010 | MacDougall | G06F 1/1626 | 345/656 |
| 2010/0201878 A1* | 8/2010 | Barenbrug | H04N 5/44591 | 348/563 |
| 2011/0107216 A1* | 5/2011 | Bi | G06F 3/011 | 715/716 |
| 2011/0141358 A1* | 6/2011 | Hardacker | H04N 5/44513 | 348/563 |
| 2011/0248987 A1* | 10/2011 | Mitchell | G06T 15/20 | 345/419 |
| 2011/0281619 A1* | 11/2011 | Cho | G06F 3/0488 | 455/566 |
| 2011/0316807 A1* | 12/2011 | Corrion | G06F 3/0416 | 345/174 |
| 2012/0013553 A1* | 1/2012 | Kim | G06F 3/0346 | 345/173 |
| 2012/0036433 A1* | 2/2012 | Zimmer | G06T 15/20 | 715/702 |
| 2013/0076649 A1* | 3/2013 | Myers | H04M 1/0268 | 345/173 |
| 2013/0091462 A1* | 4/2013 | Gray | G06F 3/0346 | 715/810 |
| 2013/0234982 A1* | 9/2013 | Kang | G06F 3/0488 | 345/174 |
| 2013/0265296 A1* | 10/2013 | Chan | G06T 15/20 | 345/419 |
| 2014/0047393 A1* | 2/2014 | Steele | G06F 3/04815 | 715/849 |
| 2014/0059478 A1* | 2/2014 | Dearman | G06F 3/04886 | 715/781 |
| 2014/0092139 A1* | 4/2014 | Sullivan | G09G 5/00 | 345/649 |
| 2014/0098027 A1* | 4/2014 | Sultenfuss | G06T 3/60 | 345/173 |
| 2014/0240252 A1* | 8/2014 | Park | G06F 3/0418 | 345/173 |
| 2014/0289668 A1* | 9/2014 | Mavrody | G06F 3/04886 | 715/781 |
| 2014/0300565 A1* | 10/2014 | Anderson | A63F 13/06 | 345/173 |
| 2014/0327630 A1* | 11/2014 | Burr | G06F 3/0488 | 345/173 |
| 2015/0177962 A1* | 6/2015 | Seong | G06F 3/04845 | 715/781 |
| 2015/0185874 A1* | 7/2015 | Raffa | G06F 3/0346 | 345/158 |
| 2015/0253984 A1* | 9/2015 | Zhang | G06F 3/04886 | 715/771 |

* cited by examiner

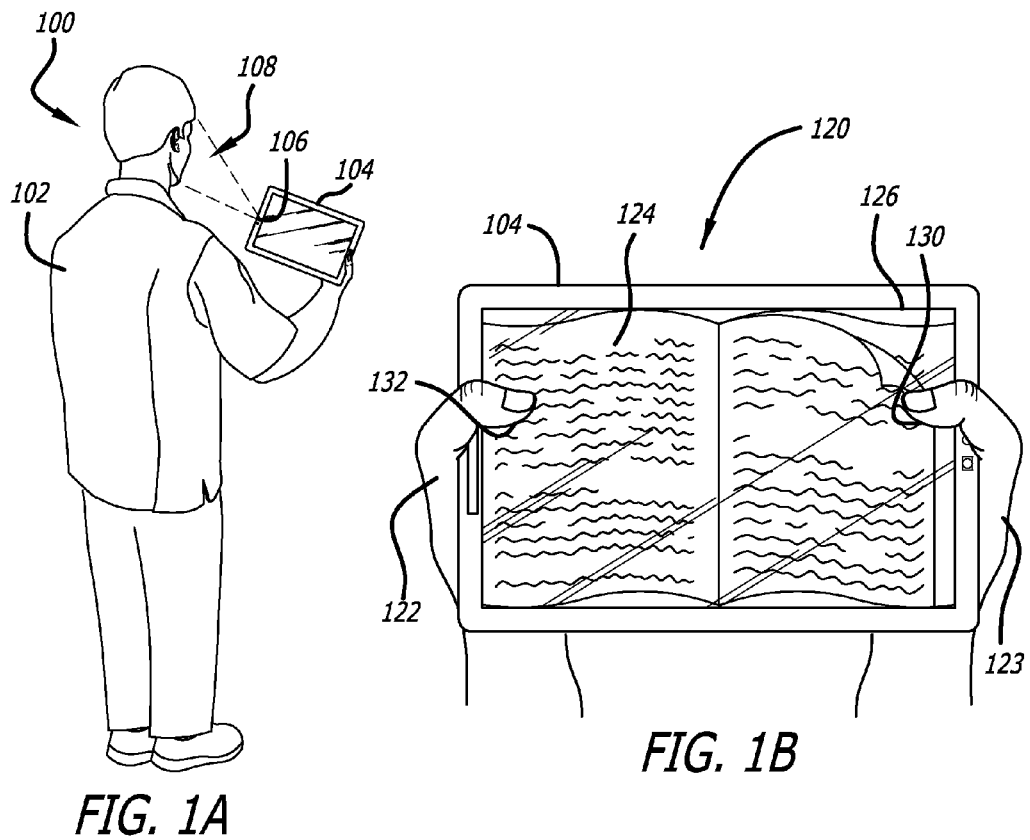
FIG. 1A
FIG. 1B
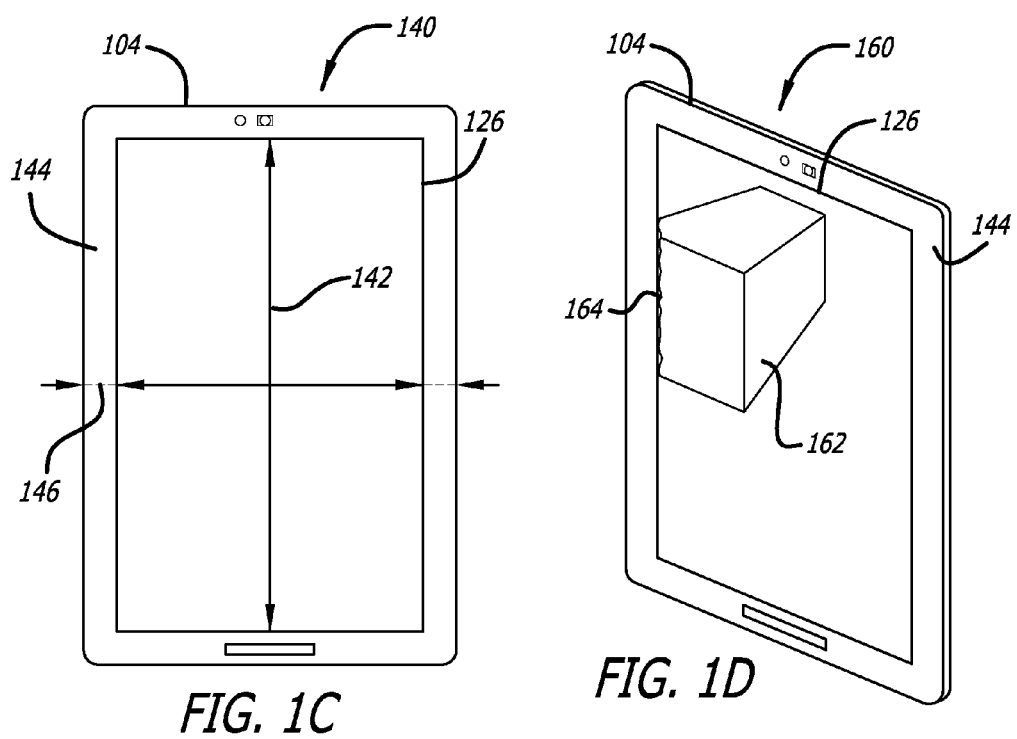
FIG. 1C
FIG. 1D

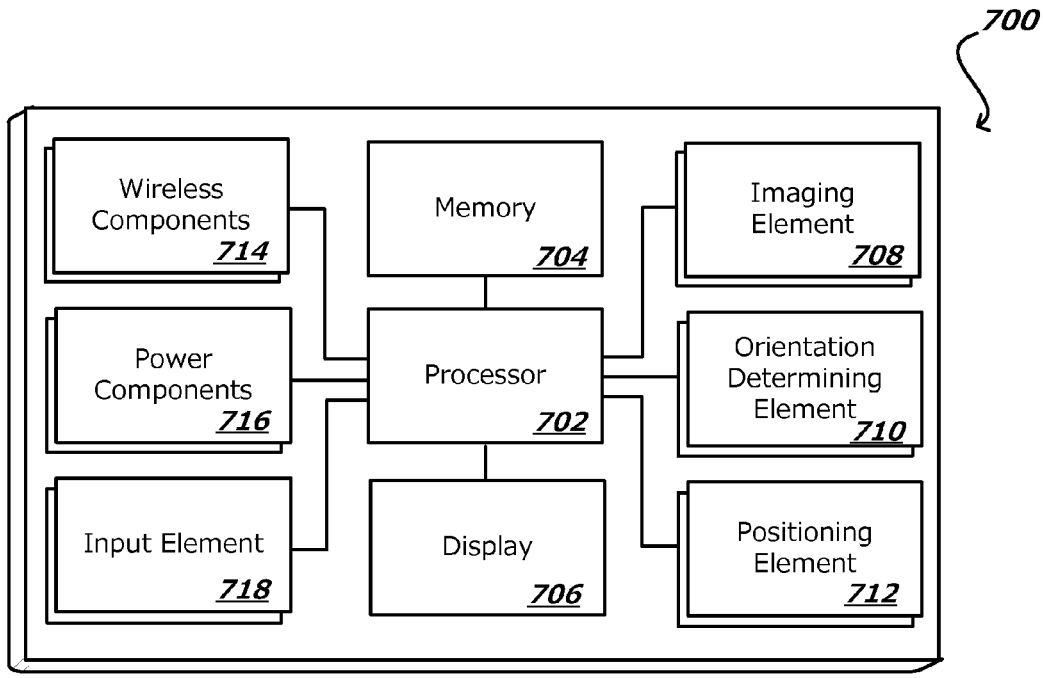
FIG. 7
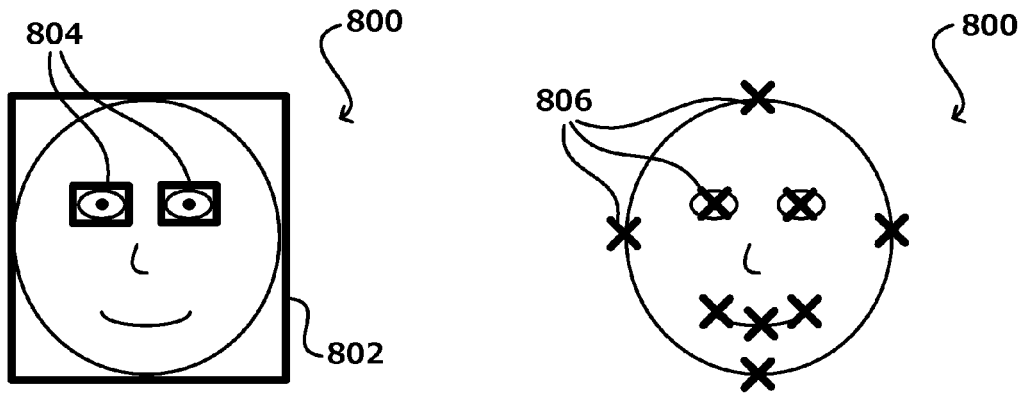
FIG. 8A
FIG. 8B

VIRTUAL SCREEN BEZEL

BACKGROUND

As the capabilities of various computing devices increase, and as people are utilizing computing devices for an increasing variety of tasks, the expectations of users of these devices continue to increase accordingly. As an example, an increasing number of applications are attempting to meet these expectations by providing a virtual reality, enhanced reality, or three-dimensional experience. While some devices utilize three-dimensional displays that require specific hardware, such as special viewing glasses, these can be expensive and complex, and can provide varying levels of user satisfaction. A large number of devices still utilize conventional two-dimensional displays or provide content that is substantially created in two dimensions. While certain shading or rendering can be utilized to give the impression of three-dimensional content, the content will typically not act like a true three-dimensional object or scene, as changes in position, orientation, or lighting will generally not be updated and displayed realistically in the display. For example, in some situations the display screen may crop or otherwise limit the amount of content displayed due to one or more aspects of the computing device. Further, as the computing device bezels (e.g., borders) around a display screen of the computing device become increasingly smaller, accidental input at the edges of the display screen is more likely. Thus, the virtual nature of the displayed content can be significantly degraded.

BRIEF DESCRIPTION OF THE DRAWINGS

Various embodiments in accordance with the present disclosure will be described with reference to the drawings, in which:

FIGS. 1A, 1B, 1C and 1D illustrates an example situation where a user can view content and interact with a computing device in accordance with various embodiments;

FIG. 7 illustrates example components of a client device such as that illustrated in FIG. 11;

FIGS. 8A-8F illustrate example approaches to determining head position and/or gaze direction that can be used in accordance with various embodiments;

DETAILED DESCRIPTION

Figure 2A:
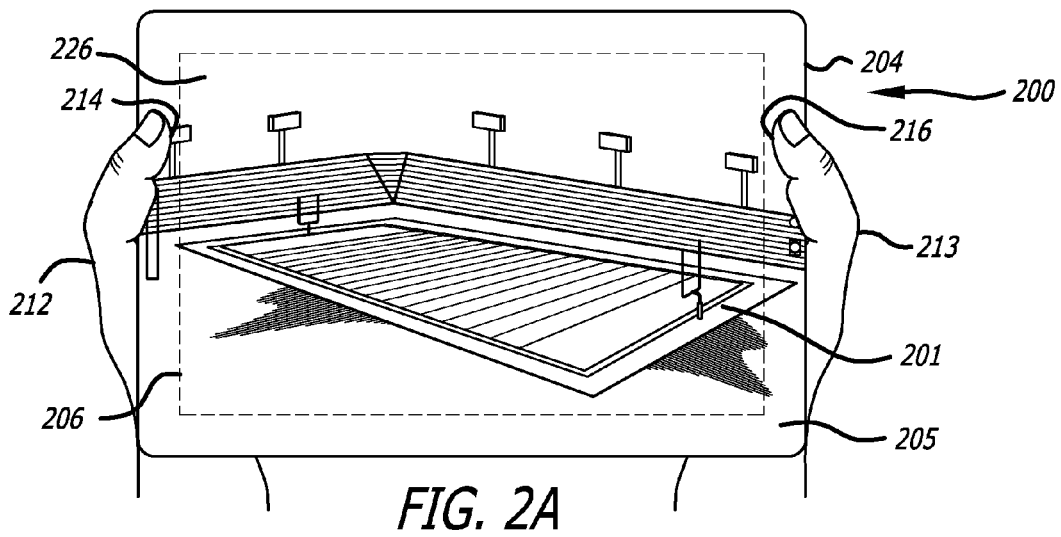
FIGS. 2A, 2B, 2C, and 2D illustrate example states of an interface that can be rendered in accordance with an embodiment.

Systems and methods in accordance with various embodiments of the present disclosure may overcome one or more of the aforementioned and other deficiencies experienced in conventional approaches to displaying content on an electronic device. In particular, various embodiments enable image content (e.g., still or video content) to be displayed to provide a viewer with an appearance or view of the content that is based at least in part upon a current relative position and/or orientation of the viewer with respect to the device, as well as changes in that relative position and/or orientation. The content can include various portions, notifications, alerts, and the like, and different adjustments can be applied to each portion and/or provided for display based upon these and/or other such changes or events. These adjustments and/or events can include, for example, changes due to parallax, occlusion, event notifications, and the like, which when added to the rendered content in response to relative movement between a viewer and a device can enhance the experience of the viewer and increase realism for content rendered on a two- or three-dimensional display screen.

In accordance with certain embodiments, a display screen (e.g., a touch-sensitive display screen) can be configured to display content and/or receive touch-based input based at least in part on a location of one or more regions on the display screen. For example, the display screen can include a virtual bezel region of a display screen that extends along, or proximate to, one or more edges of the display screen to approximate the appearance of a physical bezel (or physical border or housing) of the computing device. In at least some embodiments, the virtual bezel region surrounds a primary display region that is configured to display image content, while by default the virtual bezel region may be configured to display no content, or at least no active content, in order to approximate the appearance of a physical bezel. The virtual bezel can be configured to exhibit characteristics similar to that of the physical bezel. For example, the virtual bezel region can be configured to operate as a 'dead zone', where touch-based input is deactivated. The virtual bezel region can also be configured to display at least a portion of any content displayed in the primary display region and/or one or more notifications. Accordingly, as computing device bezels around the display screen become increasing smaller, approaches described herein advantageously prevent a user of the computing device from accidently triggering certain functions when touching near the edge of the device.

In accordance with various embodiments, the virtual bezel region can be configured to display image content. As described, this can include at least a portion of any content displayed in the display region and one or more notifications. For example, the virtual bezel region can confine the display region of the display screen. The display region can display portions of image content that can appear to be positioned and/or displayed in 3D space such that that some of the content appears closer to a surface of the display screen of the device (and hence the viewer), while other planes of content "fall back" or appear smaller in 3D space, appearing to be further from the surface of the display screen. As the viewer tilts, rotates, or otherwise changes the orientation of the device, or as the viewer's relative position or orientation changes with respect to the device, the image content can appear to translate laterally, move back and forth in apparent distance from the surface of the screen or traverse to one or more locations on the display screen, or otherwise change shape or appearance. For example, as the viewer tilts, rotates, or otherwise changes the orientation of the device, at least a portion of the image content (or different image content) can be displayed in the virtual bezel region.

The relative movements can be based upon factors such as the distance of the viewer to the device, a direction of movement of the user, a direction of change in orientation of the device, or other such factors. In this way, the relative movements can be selected such that the different layers of content appear to be positioned in three dimensions with respect to each other, and act appropriately with changes in relative position and/or orientation, and thus viewing angle, of the viewer. For example, some layers of content can be presented in the virtual bezel while other layers of content are presented in the display region.

In various embodiments, the relative position and/or orientation of a viewer of a computing device can be determined using at least one image capture element of the device. For example, the feed from a video camera can be analyzed to locate a relative position of the viewer in the video feed, which can be analyzed to determine the relative direction of the viewer. In other embodiments, one or more digital still cameras can capture images periodically, in response to detected movement of the viewer and/or device, or at other appropriate times, which then can be analyzed to attempt to determine viewer position, as distance can often be determined in addition to direction when analyzing multiple sources of information from different locations. Distance can be determined, for example, using stereoscopic imaging or proximity sensing, among other such options. In some embodiments, infrared (IR) imaging can be used to detect specific features of the viewer, such as the viewer's eyes, for use in determining and/or tracking the location of the viewer. In still other embodiments, changes in the orientation and/or position of the device can be determined using at least one motion sensor of the device, in order to provide for a higher sampling frequency than might otherwise be possible using the image information captured by the camera, or otherwise attempt to improve the relative position determinations. In some situations, a sensor that is remote, separate, or otherwise in communication with the device can be used to detect a change in orientation and/or position of the device. The orientation information can be received at the device from the sensor, and the device can cause the appearance of the interface to be altered based at least in part on the received orientation and/or position information. Accordingly, a viewer can view and interact with the image content, and can maneuver through the image content using various approaches discussed herein.

For example, based at least in part upon the determined direction of the viewer, the device can determine a primary viewing angle with respect to a plane of the display screen, and thus the image content to be rendered and displayed on the device. For at least certain types of content, the device can adjust the rendering to provide a two- or three-dimensional representation of that content that is appropriate for that viewing angle, giving the impression of a three-dimensional view or display even when the display is in two dimensions. In at least some embodiments, the types of content can correspond to content on different planes, levels, or other such groupings of content. These groupings may be specified through software, the user, etc. In some embodiments, the groupings may be provided via the operating system on the device, where different portions of an image or other content to be displayed are assigned to different layers, levels, etc. The operating system of the device can include an application library that includes one or more application files configured to render content at different depths and/or appearance, or any information configured to organize and/or render content at different regions of the display screen. The content can, for example, be based at least in part on its determined depth be displayed on one or more regions of the display screen.

Various other applications, processes, and uses are presented below with respect to the various embodiments.

FIG. 1A illustrates an example situation 100 wherein a user 102 is interacting with a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. In this example, the computing device 104 includes a camera 106 positioned on a side or corner of the device such that the imaging element will likely be able to capture image information of at least a portion of the user while the user is viewing content displayed on the device. For example, the imaging element 106 in FIG. 1A is on the front of the device such that an angular capture range 108 of the imaging element can image at least a portion of the user while the viewer is viewing content displayed on the display screen of the electronic device. As will be discussed in detail later herein, being able to capture image information for the user enables the device to determine a relative position and/or orientation of the user with respect to the device and adjust a display of content on the device in accordance with that position and/or orientation.

As described, as the bezel of the computing device becomes increasing smaller, accidental input at the edges of the display screen become more likely. For example, FIG. 1B illustrates situation 120 where the user is holding the device and intends to view content displayed on a display screen 126 of the device 104. As shown, the user is interacting with an electronic book application. In this example, the electronic book application can provide text or other content 124 on the display screen. In various embodiments, the user can interact with the electronic book application to, for example, turn pages, adjusting lighting, contrast, lookup word definitions, highlight text, etc. In this example, the user's fingers 122 and 123 used to hold the device have accidently contacted the display screen at locations 130 and 132. This can cause, for example, accidental input, which can result in undesirable results such as turning a page, closing the electronic book application, etc.

FIG. 1C illustrates an example situation 140 wherein a device 104 that includes a physical bezel 144 around the display screen. As described, in the situation where the physical bezel is too narrow, such as in FIG. 1B, the user may accidently contact and provide input to the display screen by contacting the display screen. Accordingly, a physical bezel may be provided such that that the user may hold the device without accidently making contact with the display screen. However, due to one or more industrial design considerations or other such considerations, such as an appearance and/or placement of device component, it may be desirable to decrease the width 146 of the physical bezel. This can allow for, for example, the dimensions 142 of the display screen 126 to be increased without having to increase a size of the device. Further, decreasing the width of the physical bezel may be desirable from an appearance standpoint. Further still, decreasing the width of the physical bezel can allow for additional presentation of image content. However, due to accidental input on the display screen because, for example, the bezel is too narrow, conventional devices include a bezel that of adequate size to allow for handling of such devices, thereby sacrificing display screen size. Sacrificing display screen size can, for example, result in undesirable results such as limiting a display of image content.

For example, FIG. 1D illustrates an example situation 160 wherein the display screen 126 of the device 104 includes displayed thereon a three-dimensional view of content 162. However, as the content is displayed and/or adjustments are made to the content, for example, adjustments due to parallax, occlusion or other such adjustments, at least a portion of the content may be cropped 164 by the physical bezel 144. As such, in the situation where the display screen can present the appearance of 3D, or 3D-like behavior, the virtual nature of the displayed content may be significantly degraded. Accordingly, various embodiments enable image content (e.g., still or video content) to be displayed to provide a viewer with an appearance or view of the content that is based at least in part upon a current relative position and/or orientation of the viewer with respect to the device, as well as changes in that relative position and/or orientation. In this way, various embodiments can take advantage of any of a number of elements that can be used to determine changes in relative position and/or orientation between a user and an electronic device. For example, a device can include an imaging element which can be used to capture image information for determining a relative position or direction of a user as mentioned above. An orientation-determining element, such as an accelerometer, electronic gyroscope, or inertial sensor, can determine changes in the position or orientation of the device. Other input elements, such as microphones or proximity sensors, can be used as well in other embodiments. The information from at least some of these elements can be analyzed to determine a current viewing angle from the perspective of the user. By determining the current viewing angle, for example, the device can render content that corresponds substantially to a three-dimensional view of the content from the perspective of the user. For example, the content can include various portions, notifications, alerts, and the like, and different adjustments can be applied to each portion and/or provided for display based upon these and/or other such changes or events. These adjustments and/or events can include, for example, changes due to parallax, occlusion, event notifications, and the like, which when added to the rendered content in response to relative movement between a viewer and a device can enhance the experience of the viewer and increase realism for content rendered on a two- or three-dimensional display screen. Further, the rendering can utilize 3D mapping information, such as a set of layer depths or z-levels, to determine how to relate various interface elements to each other and different regions of a display screen.

FIG. 2A illustrates an example situation 200 of an interface 201 displayed on a display screen 226 of a computing device 204. In this example, a user is viewing an interface that displays a full screen view of content. The content can include, for example, an image of a sports stadium. In this example, the front of the device includes a display screen that spans the entire width and length of the computing device. In accordance with various embodiments, in this example there can be little to no physical bezel, with the display screen going close to, or out to, the edge of the device. As described, in a conventional device, as the bezel of the computing device becomes increasing smaller, accidental input at the edges of the display screen become more likely. In accordance with various embodiments, the display screen (e.g., a touch-sensitive display screen) can be configured to display content and/or receive touch-based input based at least in part on a location of one or more regions on the display screen.

For example, the display screen can include a virtual bezel region 205 that extends along, or proximate to, one or more edges of the display screen to approximate the appearance of a physical bezel (or physical border or housing) of the computing device. In this way, the virtual bezel region can include characteristics similar to that of the physical bezel. As an example, the virtual bezel region surrounds a display region or primary display region that is configured to display image content, while by default the virtual bezel region may be configured to display no content, or at least no active content, in order to approximate the appearance of a physical bezel. The virtual bezel can be configured to exhibit characteristics similar to that of the physical bezel. For example, the virtual bezel region can be configured to operate as a 'dead zone', where touch-based input is deactivated. The virtual bezel region can also be configured to display at least a portion of any content displayed in the display region and/or one or more notifications. In this situation, as a user holds or otherwise interacts with the device, for example, to watch the sports game, contact by the user in the virtual bezel region is not received as a touch-based input. For example, as shown in FIG. 2A, the user's fingers 212 and 213 used to hold the device have accidently contacted the display screen at locations 214 and 216. Locations 214 and 216 are within the virtual bezel region. As described, the virtual bezel region is configured to operate as a 'dead zone', where touch-based input in the virtual bezel region is deactivated. If the user desired to provide a touch-based input, the user could, for example, contact an area within the primary display region 206.

Figure 2B:
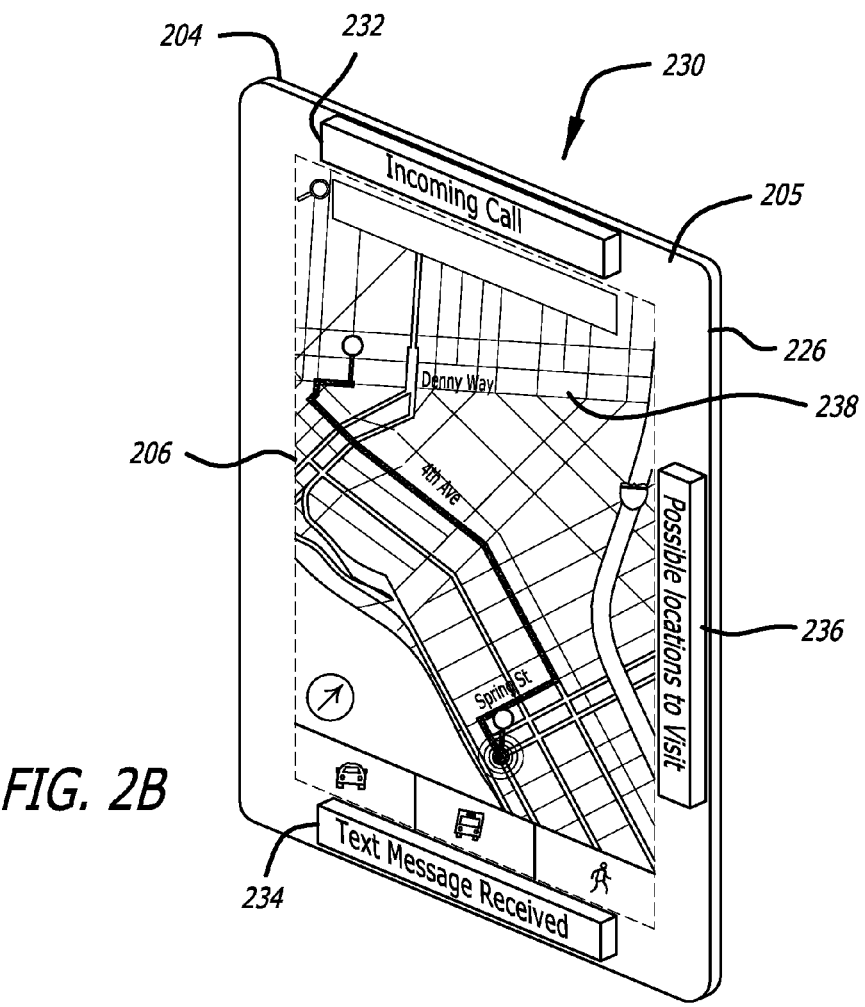

In accordance with various embodiments, the virtual bezel region on the display screen can be configured to display one or more notifications. For example, FIG. 2B illustrates an example situation 230 of an example device 204 displaying map content 238 in a primary display region 206 on a display screen 226 of the device. In this example, the user has entered an address into a mapping application, and mapping information is generated for display on the display screen. As shown, the device includes a view of a maps application confined within the primary display region 206 and one or more notifications (232, 234, and 236) displayed in a virtual bezel region 205. In this example, the user can interact with the mapping application as may include searching a geographic area, providing a search query, receiving directions, etc.

As the user interacts with the mapping application, one or more notifications can be displayed in the virtual bezel region. In some situations, the user can interact with the notifications as may include selecting the notification which may cause additional information to be displayed and/or cause an event to occur. For example, in the situation where an incoming call notification 232 is received, the user can tap or otherwise make contact with the notification to receive additional information and/or cause an action to occur. For example, the incoming call notification 232 can be a user-selectable element. In response to the user selecting the incoming call notification, the user can be provided a display of the number and/or name of the incoming call, for example. In some situations, selecting the incoming call notification can cause a phone application to be launched and the user can then interact with the phone application to perform one or more functions associated with the phone application.

In accordance with another embodiment, the text message received notification 234 can be a user-selectable element. In response to the user selecting the incoming text message notification, the user can be provided a display of the message and/or name of the incoming second of the message, for example. In some situations, selecting the incoming text message notification can cause a messaging application to be launched and the user can then interact with the messaging application to perform one or more functions associated with the messaging application.

In accordance with yet another embodiment, a notification including additional information and that is related to the displayed and/or in-focus application can be displayed. In this example, the in-focus application corresponds to the mapping application and a notification for possible locations to visit 236 can be displayed in the virtual bezel region 205. The notification can be a user-selectable element. In response to the user selecting the notification, the mapping application can display possible locations to visit. In this way, the notification can affect a display and/or operating of the in-focus application as may include displaying additional content. It should be noted that various other notifications and/or messages can be provided within the virtual bezel region. As described, the notifications can be user-selectable elements capable of receiving a touch-based input and/or notification prompts configured to display information.

In accordance with various embodiments, some content can be displayed in the virtual bezel region while other content can be displayed in the primary display region. In some situations, at least a portion of the image content displayed in the primary display region can be displayed in the virtual bezel region. In this way, the content can "break out" of the primary display region into the virtual bezel region. Accordingly, in accordance with various embodiments, content can be tagged or otherwise be associated with appearance or location information or other information that can cause the content to be displayed in different regions of the display screen. The portions of image content can be controlled in a number of different ways. One such way is to organize the image content in a user interface hierarchy, such as one that includes parent and child nodes that correspond to user interface elements of the image content. An example of a user interface hierarchy can include, for example, a root node of the hierarchy, where there may be a layout container or view group that sets forth how its children are to be arranged for display. Examples of layouts can include frame layouts, linear layouts, relative positioning layouts, grid-based layouts, among others.

In accordance with various embodiments, layout containers can include one or more child layout containers. Child layout containers can include one or more of their own child layout containers and one or more of their own view. In some embodiments, a layout can be defined declaratively in a language such as extensible markup language (XML) and/or programmatically in a language such as Java®. An advantage of such an approach can enable the "look" of an application to be designed without particularized knowledge of software programming. The user interface hierarchy can include layout information that can be used to determine the relative position or layout of one interface element to another interface element. Accordingly, using the hierarchy of interface elements, developers can quickly and efficiently modify the appearance and/or actions of the interface elements to create an interactive interface.

The layout information can correspond to, for example, the relative position of one interface element of the content to another interface element (e.g., the x/y coordinates of one interface element to another interface element). Additionally, the layout information can correspond to depth information or screen-space position information. In this way, the position information can include a lateral position (x/y coordinates) and a depth position (z coordinate) of the interface element relative to the display screen.

In accordance with various embodiments, developers can specify attributes to control the presentation of interface elements and other content. This can include break out attributes or other attributes or information that control whether the content can be displayed in the virtual bezel region or another region of the display screen (e.g., the primary display region). Other attributes include 3D attributes (e.g., the appearance, depth, animations, location, etc.) of the interface elements to specify how the interface elements appear based on the relative position, direction, and/or orientation between the viewer and device to provide a two- or three-dimensional representation of that content that is appropriate for that viewing angle, giving the impression of a three-dimensional view or display even when the display is in two dimensions.

Figure 2C:
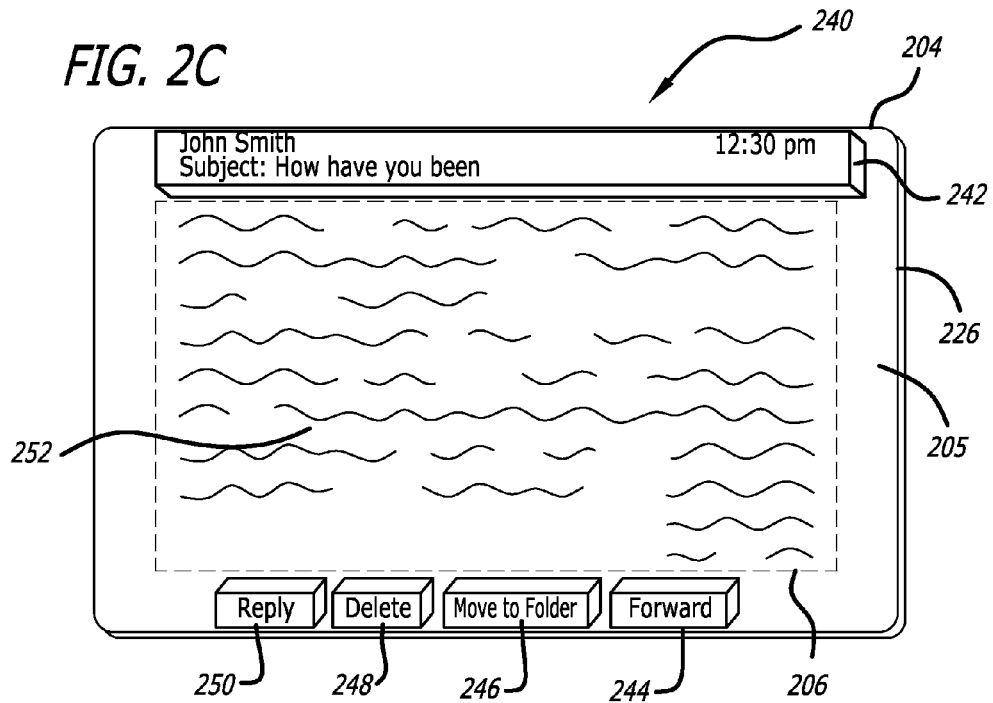

For example, FIG. 2C illustrates an example situation 240 of one such example wherein based on changes in content position due to animations or scrolling, content can be displayed in one or more regions on the display screen. In this example, a user is interacting with a computing device 204. The user can be interacting with, for example, an electronic mail application displayed on the display screen 226 of the computing device 204. As the user interacts with the application, attributes associated with the content can be used to control the presentation of interface elements and other content of the application. For example, as shown, in response to a user opening an electronic message, one or more interface elements can be displayed in the virtual bezel region 205. In this example, the user is interacting with an electronic mail application and the interface elements can include, for example, a user-selectable element to forward an electronic message 244, a user-selectable element to move an electronic message 246, a user-selectable element to delete an electronic message 248, and a user-selectable element to reply to an electronic message 250. In this example, the interface elements are shown displayed towards the bottom of the device. Such an arrangement allows a user to hold the device without contacting any of the elements. However, it should be noted that the elements can be positioned in various other location within or near the virtual bezel region.

As shown in FIG. 2C, as the user scrolls the electronic message 252, a header portion 242 of the electronic message can remain fixed in the virtual bezel as the remainder of the electronic message 252 is scrolled under the virtual bezel. Accordingly, in accordance with various embodiments, some content (e.g., the header portion 242) can be displayed in the virtual bezel region while other content (e.g., the body of the electronic message 252) can be displayed in a display region 206. As described, the virtual bezel region can surround or otherwise confine a primary display region or area of the display screen. In this way, content can "break out" of the primary display region into the virtual bezel region.

Figure 2D:
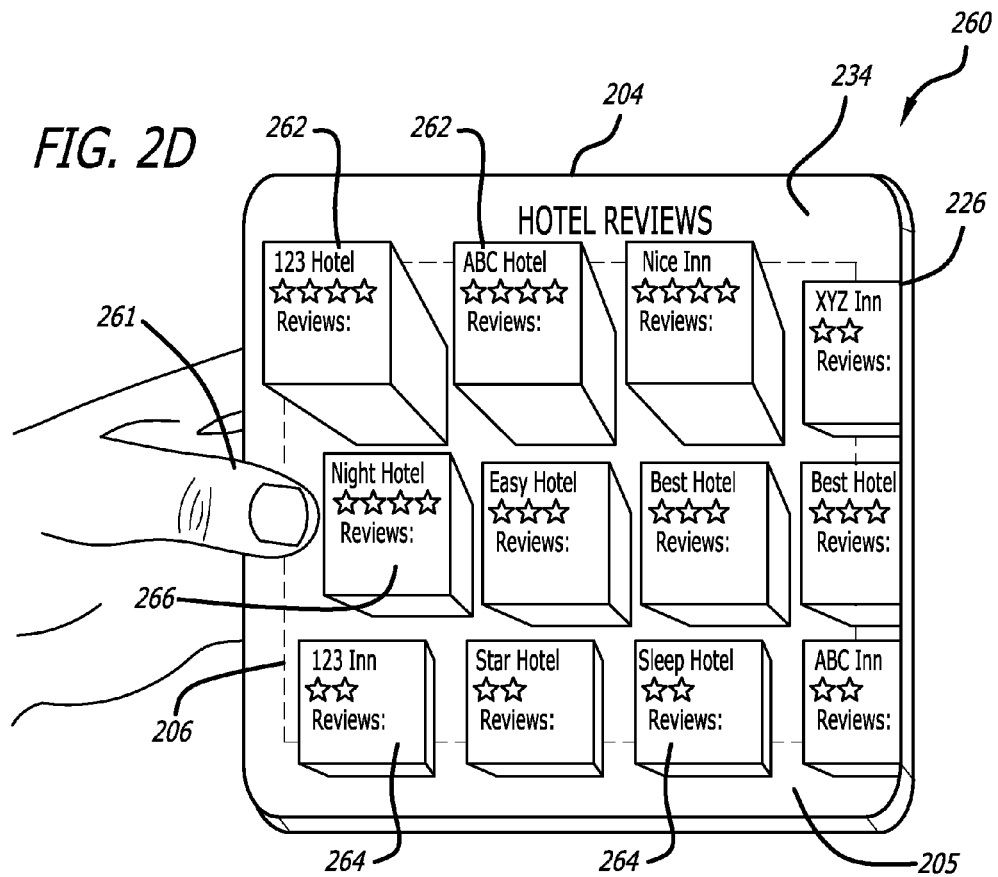

An approach in accordance with various embodiments can utilize layers of graphical elements that can move at different rates with respect to each other or be displayed in different regions of the display screen, providing a sense of depth and three-dimensional movement. This can include rendering a view to have at least two (and in many situations more) different "levels" or z-depths, where the upper level of some interface elements is rendered to appear near the outer surface of the display screen and the upper level of other interface elements can be rendered to appear at a lower level to the interface (e.g., separated a distance from the outer surface of the display screen). For example, FIG. 2D illustrates example situation 260 wherein a user is interacting with a computing device 204. The user can be, for example, interacting with a hotel ratings application displayed on the display screen 226 of the computing device 204. As the user interacts with the application, attributes associated with the content can be used to control the presentation of interface elements and other content. For example, as shown, one or more interface elements can be displayed to appear closer to a surface of the display screen of the device (and hence the viewer), while other interface elements "fall back" or appear smaller in 3D space, appearing to be further from the surface of the display screen.

For example, the user can cause the highly rated hotels (e.g., hotels receiving at least four stars) to be displayed closer to the surface of the display screen than lower rated hotels. This can include, for example, displaying three and four star hotels (e.g., interface elements 262) near the surface of the display screen and one, two, and three star hotels (e.g., interface elements 264) further from the display screen. Accordingly, in this example, a first layer of elements 262 can be rendered "over" a second layer of elements 264. It should be understood that there can be any number of levels including any appropriate number of elements, and that the ordering of the various layers can be adjusted or selected using any of a number of potential approaches, such as sorting or navigating the various layers. In this example, the elements of each layer are rendered with a different relative size, providing to the user a sense of distance of the various elements.

In accordance with various embodiments, the user can cause the interface elements to rearrange according to one or more approaches. In one such approach, when the user (not shown) is in a default position (or within a default range of positions) with respect to the device, such as substantially in front of the display screen, all hotel ratings can appear relatively flat. If the user moves the device, or moves relative to the device, hotel ratings that meet at least a predetermined or user-selected rating can be rendered at a depth above the lower rated hotels. In doing so, the device can use information such as the field of view of the camera, as well as the position of the user's head or eyes to determine a current point of view of a user, and the point of view can be used to render an interface on a display screen or other such element of the computing device. The rendering can update as the determined point of view changes as a result of movement of the user and/or the computing device. The rendering can utilize 3D mapping information, such as a set of layer depths or z-levels, to determine how to relate various interface elements to each other such as to display any changes due to parallax or other effects. For example, as shown one or more interface elements are caused to be displayed in the virtual bezel region due to a change in the relative position of the device to the user.

In various embodiments, the interface elements may interact with the user of the device and/or another object. For example, as the position of the device relative to the user changes, the information from at least some of these elements can be analyzed to determine a current viewing angle from the perspective of the user. By determining the current viewing angle, for example, the device can render content that corresponds substantially to a three-dimensional view of the content from the perspective of the user. In some situations, however, as interface elements (for example interface element 266) are surfaced to appear closer to the display screen, the interface element can "bump" against the user's finger 261 and shift laterally to the side. Accordingly, in accordance with various embodiments, the portions of image content can be controlled in a number of different ways based at least in part on control information, attributes, or other information associated with the content. It should be noted that various other changes to appearance and location of the content is possible with the embodiments described herein.

As described, in accordance with various embodiments, the display screen can be configured to display image content in different regions. For example, the virtual bezel region can surround a primary display region of the display screen and the primary display region can display portions of image content that can appear to be positioned and/or displayed in 3D space such that that some of the content appears closer to a surface of the display screen of the device (and hence the viewer), while other planes of content "fall back" or appear smaller in 3D space, appearing to be further from the surface of the display screen. As the viewer tilts, rotates, or otherwise changes the orientation of the device, or as the viewer's relative position or orientation changes with respect to the device, the image content can appear to translate laterally, move back and forth in apparent distance from the surface of the screen, or otherwise change shape or appearance. The relative movements can be based upon factors such as the distance of the viewer to the device, a direction of movement of the user, a direction of change in orientation of the device, or other such factors. The relative movements can be selected such that the different layers of content appear to be positioned in three dimensions with respect to each other, and act appropriately with changes in relative position and/or orientation, and thus viewing angle, of the viewer. For example, some layers of content can be presented in the virtual bezel region while other layers of content are presented in the primary display region.

Figure 3A:
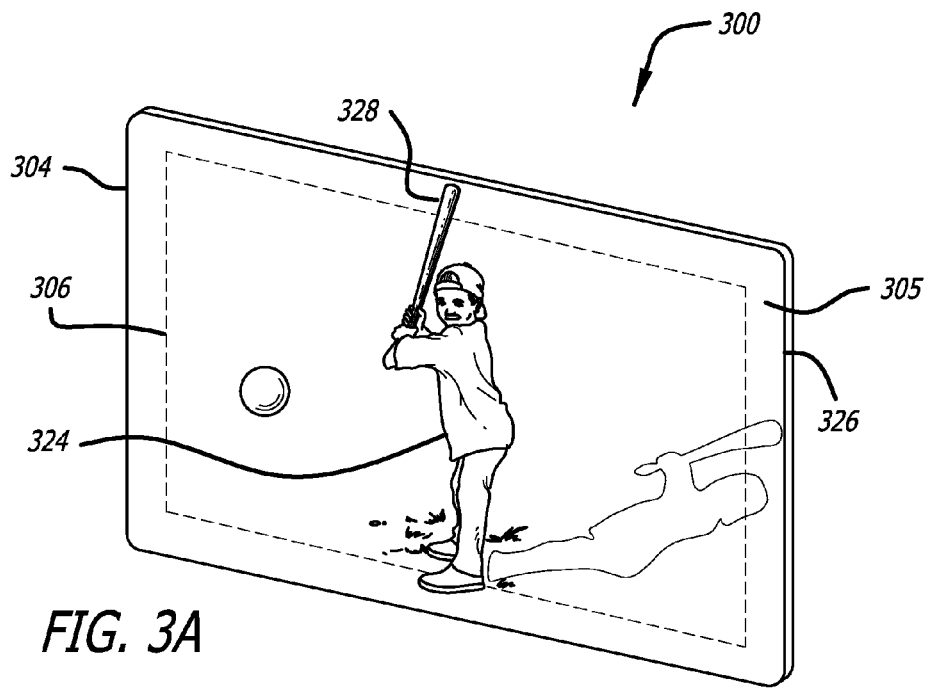
FIGS. 3A and 3B illustrate example states of an interface that can be rendered in accordance with various embodiments.

For example, FIG. 3A illustrates example situation 300 wherein a user is interacting with a computing device 304. The user can be, for example, interacting with a video application displayed on a display screen 326 of the computing device 304. As the user interacts with the application, attributes associated with the content can be used to control the presentation of interface elements and other content. For example, the display of content can be based at least in part on the relative position, direction, and/or orientation between the viewer and device, approaches provide a two- or three-dimensional representation of that content that is appropriate for that viewing angle.

In this example, as the user interacts with the content and/or the relative position of the viewer and/or orientation of the device changes, the content can be displayed in different regions of the display screen, as may include the virtual bezel region 305 or other region such as the primary display region 306. Additionally or alternatively, the position information for corresponding content can be updated, and the updated position information can be used to adjust the perspective from which the content is rendered to correspond to changes in the relative viewing angle of the viewer.

For example, as shown in FIG. 3A, the display screen is separated into a primary display region 306 and a virtual bezel region 305, where both regions are configured to display content. As described, the display screen can include the virtual bezel region of the display screen that extends along, or proximate to, one or more edges of the display screen to approximate the appearance of a physical bezel (or physical border or housing) of the computing device. The virtual bezel region surrounds the primary display region that is configured to display image content, while by default the virtual bezel region may be configured to display no content, or at least no active content, in order to approximate the appearance of a physical bezel. The virtual bezel can be configured to exhibit characteristics similar to that of the physical bezel. For example, the virtual bezel region can be configured to operate as a 'dead zone', where touch-based input is deactivated. The virtual bezel region can also be configured to display at least a portion of any content displayed in the display region and/or one or more notifications. In accordance with various embodiments, in response to changes in the relative position, direction, and/or orientation between the viewer and device, content can be displayed in different regions and/or be adjusted based at least in part to adjust a scale and a translation for the content. As shown, a three-dimensional representation of the character is displayed. As the character moves or otherwise is in action, portions of the character can "break out" of the primary display area into the virtual bezel area. In this example, the character is swinging a bat and as shown, a first portion 324 of the representation of the character is displayed in the primary display region 306 and a second portion 328 of the character is displayed in the virtual bezel region 305. In conventional devices, the content displayed in region 305 may be cropped (as illustrated in FIG. 1D). In accordance with various embodiments described herein, the content is displayed to take up the entire display area of the display screen. In some situations, content may cause certain effects to occur as may include a shadow or other effect based at least in part on the content. In this example, as the character moves, the character's shadow may break out of the primary display region into the virtual bezel display region. In this way, the perspective and location from which the content is rendered can be adjusted to correspond to changes in the relative viewing angle of the viewer and/or due to the content while advantageously allowing for an increased display area.

Figure 3B:
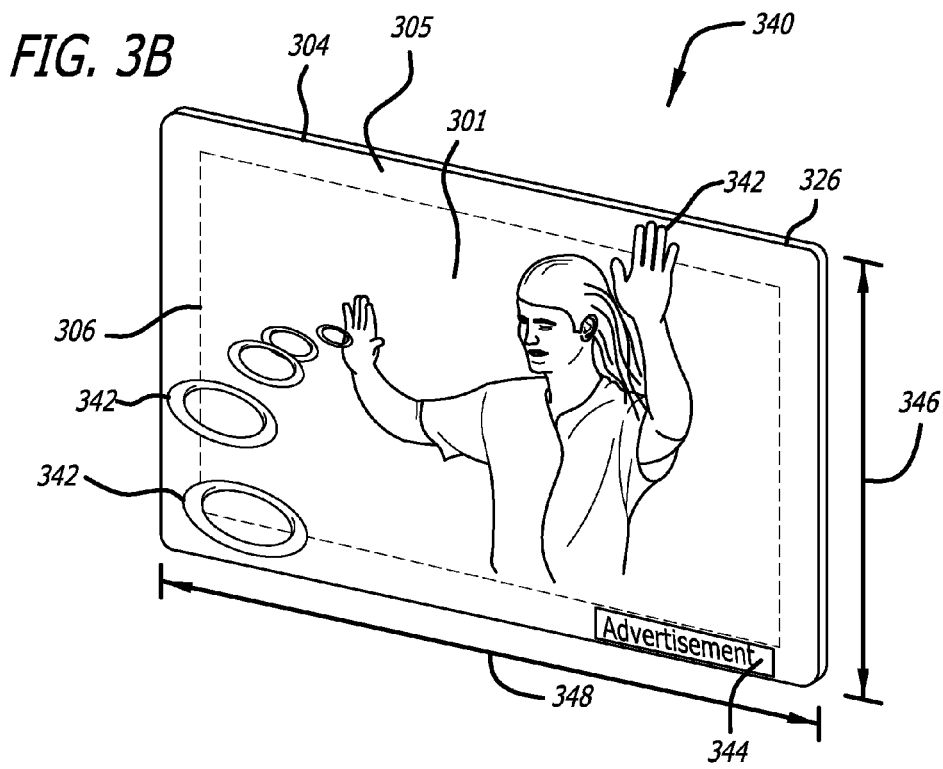

In another example, FIG. 3B illustrates example situation 340 wherein a user is interacting with a computing device 304. The user can be, for example, interacting with a video application, wherein displayed on interface 301 of display screen 326 can be a movie. As the user interacts with the application, attributes associated with the content can be used to control the presentation of interface elements and other content. For example, the content can be displayed in different regions of the display screen, as may include the virtual bezel region 305 or other region such as the primary display region 306. Adjustments can further include enhancing a three-dimensional effect or other three-dimensional situation. For example, as shown, a character is displayed in the primary display region 306 of the display screen. The character can cause a number of rings to move from the character's hand out towards the display screen. As the rings move from or out of the character's hand, at least a portion of the rings or other aspect of the character 342 can break out of the primary display region into the virtual bezel region 305. In conventional devices, the content in bezel region 305 may be cropped. In accordance with various embodiments described herein, the content is displayed in both regions to take up the entire display area on the display screen 326 as well as to enhance any three-dimensional effects as may include displaying a two- or three-dimensional representation of objects on the entire display area of the device. In this example, this includes the width 346 of the device and length 348 of the device. For example, the effective display size of the display screen can extend along, or proximate to, one or more edges of the computing device. It should be noted that in various embodiments, the display screen not include the same or substantially similar dimensions as the device, but rather a portion or ratio of said dimensions.

In accordance with various embodiments, the virtual bezel region 305 on the display screen can be configured to display one or more notifications. For example, FIG. 3B illustrates an example device displaying a representation of a sport stadium on a display screen of the device. As shown, the device includes a view of the sports stadium confined within a display region 306 and at least a portion of the sports stadium being displayed in the virtual bezel region 305. Also displayed in the virtual bezel region are one or more notifications 344. In accordance with various embodiments, the user can interact with the notifications as may include selecting the notification which may cause additional information to be displayed and/or cause an event to occur. For example, in the situation where the advertisement 344 is displayed, the user can tap or otherwise make contact with the notification to receive additional information about the product or service advertised. This can include displaying a pop-up window with such information or opening a web browsing that includes a webpage that includes the information. In some situations, other information can be displayed as may include information related to content being displayed on the computing device. For example, in the situation where a sports stadium and/or sporting event is displayed, the additional information can include a score notification or other related information to the displayed content. It should be noted that, the notifications can include graphical icons that can represent applications, folders, shortcuts, or any other type of object known or used on electronic devices to access various types of functionality or information.

In at least some embodiments, the computing device can attempt to determine changes in the relative position, direction, and/or orientation between the viewer and device in order to update the perspective from which the displayed content is rendered or otherwise displayed. For example, the device can continue capturing and analyzing image information to attempt to determine changes in relative position of the viewer, such as may be based on movement of the viewer and/or the device. The device also can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed. The display can be updated based at least in part upon changes in orientation as well. By adjusting the perspective from which the image content is rendered to correspond to changes in the relative viewing angle of the user, a three-dimensional representation can be generated on a two- or three-dimensional display screen that is consistent, across multiple viewing angles, with actual or virtual three-dimensional content. The three dimensional representation can, for example, be displayed on one or more regions of the display screen.

Figure 4:
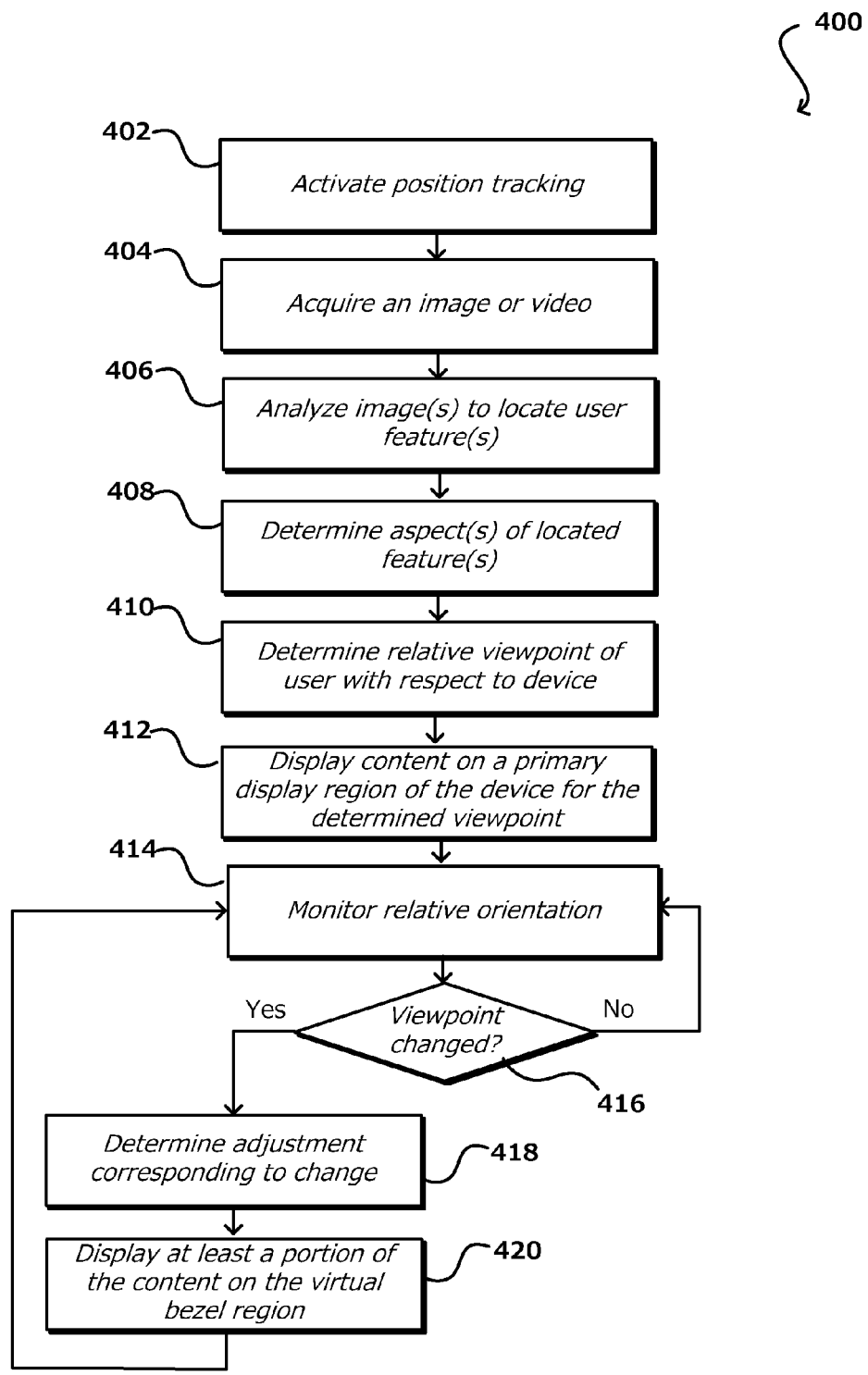
FIG. 4 illustrates an example process for updating a display of information to account for orientation changes in accordance with various embodiments.

FIG. 4 illustrates an example of process 400 for providing a relative orientation-based image display that can be used in accordance with various embodiments. It should be understood that, for any process discussed herein, there can be additional, fewer, or alternative steps performed in similar or alternative orders, or in parallel, within the scope of the various embodiments unless otherwise stated. In this example, position tracking of a viewer is activated 402 on the device. In some embodiments a user may activate this mode manually, while in other modes the device can activate the mode automatically when a person is detected nearby. Other modes of activation are possible as well, such as upon a user opening a specific application on the device. When the position tracking is active, a camera (e.g., camera 106 of FIG. 1) of the device can acquire 404 still images or video of a user of the device. As discussed elsewhere herein, in some embodiments, the imaging will involve ambient light image or video capture, while in other embodiments a device can utilize infrared imaging, heat signature detection, or any other such approach. The device can analyze 406 the captured images to attempt to locate features of a user, or at least a person nearby, where those features in some embodiments include at least the eyes, nose, or head of a user. In some embodiments, the device will attempt to locate an object that is shaped like a human head and that contains two eye-like features. In other embodiments, facial recognition or any other such algorithm can be used to attempt to determine the presence of a human head, or other portion or feature of a user, in the field of view of at least one of the imaging elements.

Once the user features are located, the device can attempt to determine 408 aspects or information relating to those features such as the approximate location and size of the user's head or face. In this example, the determined aspects can be used to attempt to determine 410 a relative orientation between the device and the user, as well as the orientation of those features relative to the device in at least some embodiments, which can be useful in determining information such as a location of a viewer or user of the computing device. For example the location of the user can be determined using the information (e.g., the positions of the user's eyes, pupils, head, or other such features), which can be indicative of at least a general point of view. Software executing on the computing device (or otherwise in communication with the computing device) can obtain information such as the angular field of view of the camera, the zoom level at which the information is currently being captured, and any other such relevant information, which can enable the software to determine an approximate direction of at least one of the user's eyes with respect to the camera. In many embodiments, direction information will be sufficient to provide adequate point-of-view dependent rendering. Image content (e.g., images, text, planes of content, etc.) can be displayed 412 on a primary region of the display screen based on the determined viewing location of the user. As described, image content can be displayed to a viewer with an appearance or view of the content that is based at least in part upon a current relative position and/or orientation of the viewer with respect to the device, as well as changes in that relative position and/or orientation. The content can include various portions, notifications, alerts, and the like, and different adjustments can be applied to each portion and/or provided for display based upon these and/or other such changes or events. These adjustments and/or events can include, for example, changes due to parallax, occlusion, event notifications, and the like, which when added to the rendered content in response to relative movement between a viewer and a device can enhance the experience of the viewer and increase realism for content rendered on a two- or three-dimensional display screen. The determined aspects of the user then can be monitored 414 over time, such as by continuing to capture and analyze image information to determine the relative position of the user and/or orientation of the device. In at least some embodiments, an orientation-determining element such as an accelerometer or electronic gyroscope can be used to assist in tracking the relative location of the user and/or current relative orientation of the device. A change in the aspect, such as a change in position or orientation, can be determined 416, and the device can determine 418 whether that change requires an adjustment to the image to be displayed. For example, an application might require the device to be rotated a minimum amount before adjusting the displayed image content, such as to account for a normal amount of user jitter or other such movement that may not be intended as input. Similarly, certain embodiments might not utilize continuous rotation, but might change views upon certain degrees of change in relative orientation of the device and/or a position of the user relative to the device. If the orientation change is sufficient to warrant an adjustment, the device can determine and perform the appropriate adjustment to the content, such as to adjust the screen-space position of interface elements. For example, the device can display 420 at least a portion of the content on the virtual bezel region.

Figure 5A:
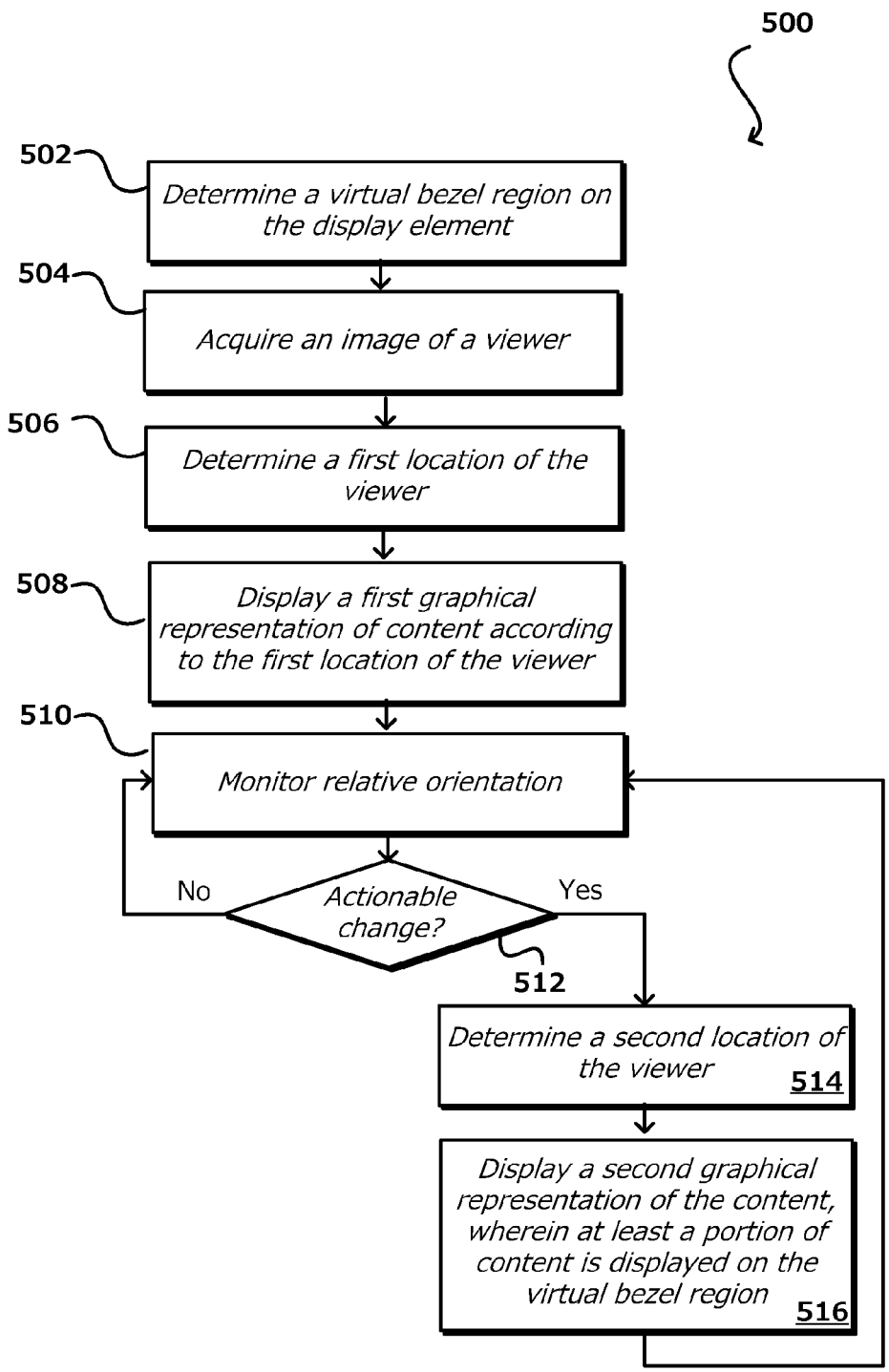
FIGS. 5A, 5B, and 5C illustrate an example processes for displaying content that can be used in accordance with various embodiments.

As an example of one such adjustment, FIG. 5A illustrates a process 500 for modifying the image in response to a determined change in orientation that can be used in accordance with various embodiments. During operation, an electronic device can determine 502 a virtual bezel region on the display screen, the virtual bezel region configured to confine a primary display region on the display screen. As described, the display screen can include a virtual bezel region of a display screen that extends along, or proximate to, one or more edges of the display screen to approximate the appearance of a physical bezel (or physical border or housing) of the computing device. In at least some embodiments, the virtual bezel region surrounds a display region or primary display region that is configured to display image content, while by default the virtual bezel region may be configured to display no content, or at least no active content, in order to approximate the appearance of a physical bezel. The virtual bezel can be configured to exhibit characteristics similar to that of the physical bezel. For example, the virtual bezel region can be configured to operate as a 'dead zone', where touch-based input is deactivated. The virtual bezel region can also be configured to display at least a portion of any content displayed in the display region and/or one or more notifications.

The device can acquire 504, using a camera of the device, at least an image of a viewer of the device. The device can determine 506 (and monitor over time), by analyzing the image, a first location of the viewer with respect to the computing device. An application executing on the device (or remote to the device) can utilize mapping, the position information, or other such data to render image content from a perspective associated with the first location of the viewer. For example, the device can display 508, on the display screen, a first graphical representation of the content, the first graphical representation being displayed to correspond to the first location of the viewer and having a first lateral offset and a first depth position relative to the display screen.

Once the viewing direction of the user is determined, the device can attempt to monitor 510 or detect changes in the viewing direction or relative position, as may result from changes in position or orientation of the user and/or the device. Changes in the relative position can be analyzed to determine whether the change is actionable 512 to cause the device to update the displayed interface, such as where the change meets a minimum movement threshold. In some embodiments, small movements might not result in adjustments in the display, in order to account for jitter or subtle variations due to the user holding a device, for example, that are not intended as input to change the perspective. In various embodiments, there also may be a minimum amount of movement desired in order to justify the re-rendering of the displayed image content. For example, cellular phones and portable media players might not have a significant amount of graphics processing capacity, such that continually attempting to re-render content using three-dimensional maps or other such information can consume a significant amount of resources of the device, slowing down the rendering and potentially other functionality. Further, continually performing complex renderings can significantly drain battery power for at least certain devices. Thus, for at least some devices it can be desirable to at least wait to re-render the image from a different perspective until there is a minimum amount of movement, etc.

If there is no actionable movement, the device can continue to monitor the relative position of the user. If there is actionable movement detected, the device can attempt to determine the new relative position, orientation, and/or viewing angle, using any of the approaches discussed or suggested herein. For example, the device can determine 514, by analyzing at a second image acquired by the camera, a second location of the viewer with respect to the computing device. The device can then determine, for the subset or portion of the content, at least a lateral offset for the content based at least in part upon the second location of the viewer relative to the computing device. The device can then display 516 a second graphical representation of the content the display screen, wherein at least a portion of the content is shifted from the first lateral position to a second lateral position by an amount equal to the lateral offset, the portion of the content being displayed on the virtual bezel region at least at the first depth position. As discussed, the image information can be manipulated (e.g., rotated, stretched, compressed, translated, etc.) to provide a consistent quasi-three-dimensional view as discussed elsewhere herein. As discussed, additional information can be added as well, such as notifications, alerts, etc.

Figure 5B:
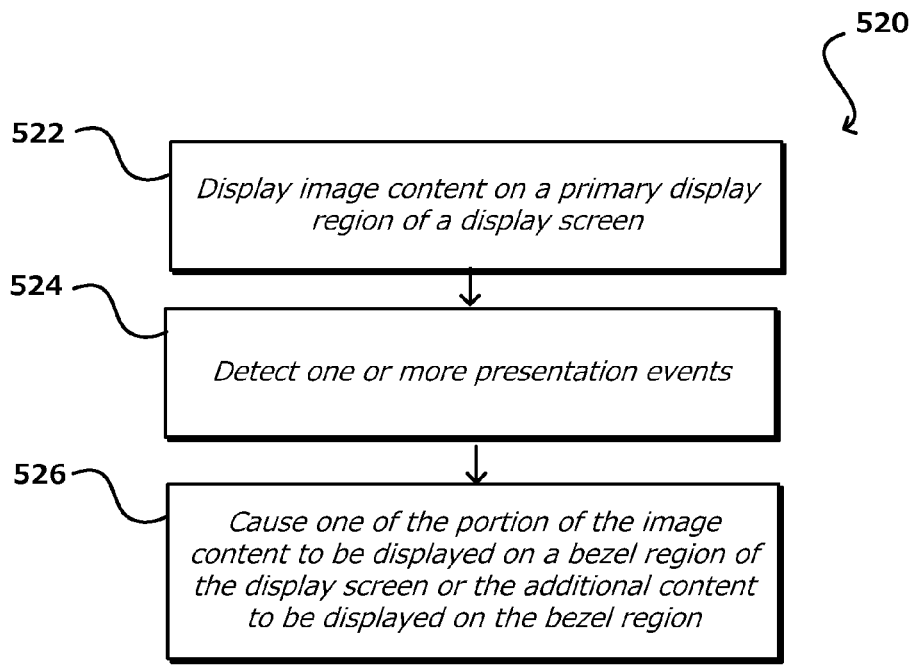

FIG. 5B illustrates a process 520 for displaying image content in accordance with various embodiments. During operation, an electronic device can display 522 image content on a primary display region of a display screen. The display can further include a bezel region that can be configured to surround the primary display region, wherein the bezel region can be configured to display one of additional content or at least a portion of the content displayed on the primary display region. In accordance with an embodiment, the content can include a plurality of graphical elements, and displaying the portion of the content can includes detecting, using an orientation determining element of the computing device, a change in orientation of the computing device; and adjusting a scale and a translation for a respective graphical element of the plurality of graphical elements based at least in part on the change in orientation of the computing device and a depth position of each graphical element of the plurality of graphical elements relative to the display screen. In certain embodiments, displaying the portion of the content can include detecting a change in orientation of the computing device; shifting from a first lateral position to a second lateral position of at least a portion of the plurality of graphical elements based at least in part on the change in orientation of the computing device; and displaying the portion of the plurality of graphical elements in the bezel region.

The device can detect 524 one or more presentation events. In accordance with various embodiments, the presentation event can include at least one of a change in orientation of the computing device, an operating system event, or an application event, the operating system event and the application event causing content to be displayed in the bezel region. An operating system event can include a notification or action prompted by the operating system, for example. The application event can include a notification or action prompted by an application.

In response to detecting at least one presentation event, the device can cause 526 one of the portion of the content to be displayed on the bezel region or the additional content to be displayed on the bezel region. For example, in accordance with an embodiment, the content can include a plurality of graphical elements and the device can render at least a portion of plurality of graphical elements to appear closer to a viewer of the display screen relative to at least one graphical element of the plurality of graphical elements. In various situations, the device can display at least one of a notification, a user-selectable element, or advertisement in the bezel region.

Figure 5C:
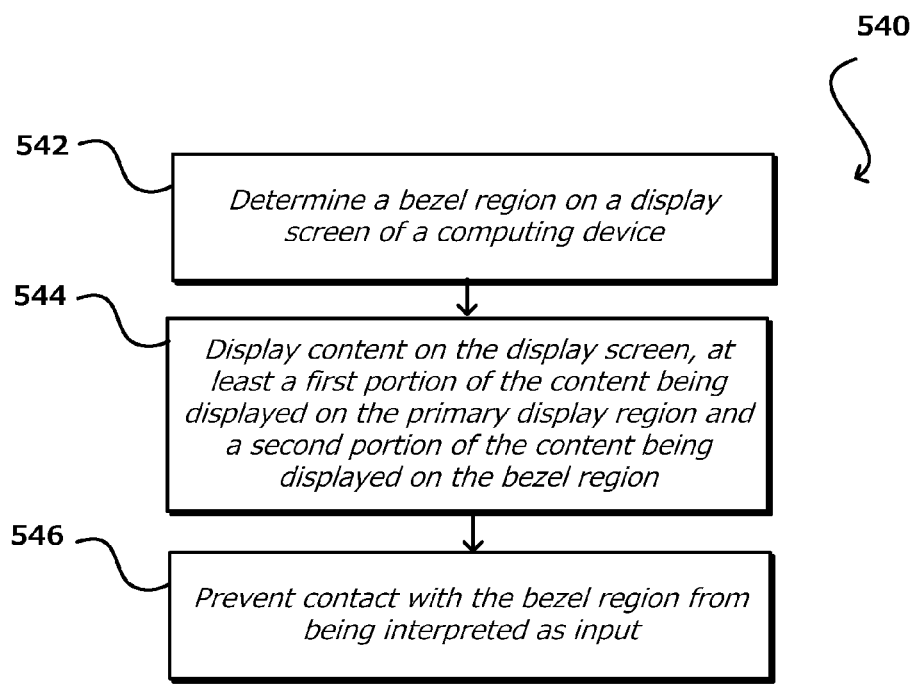

FIG. 5C illustrates a process 540 for displaying image content in accordance with various embodiments. During operation, an electronic device can determine 542 a bezel region on a display screen of a computing device, wherein a primary display region can be surrounded by the bezel region. In accordance with various embodiments, the bezel region can extend along, or proximate to, one or more edges of the display screen to approximate the appearance of a physical bezel (or physical border or housing) of the computing device. The bezel region can be configured to display image content and/or at least no active content, in order to approximate the appearance of a physical bezel. For example, the device can display 544 content on an entire viewing area of the display screen, wherein at least a first portion of the content can be displayed on the primary display region and a second portion of the content being displayed on the bezel region. In accordance with an embodiment, the first portion of content can include one or more aspects of an application, an image, or video. The second portion can include, for example, additional content as may include at least one of a notification, a user-selectable element, or advertisement, or content related or otherwise associated with content primarily displayed in the primary display region. Related content can include, for example, shadows, three-dimensional effects, or various other renderings or aspects of image content.

The device can prevent 546 contact with the bezel region from being interpreted as input. In accordance with various embodiments, the contact can include a touch-based gesture input by at least one of a finger or an object. For example, a user of the device can contact the device using at least one finger, where the contact can cause at least one function or event to occur. This can include, for example, launching an application, performing a function in an application or in the operating system, and the like. In this situation, touch-based input can be enabled in the primary display region and disabled in the bezel region. This advantageously enables a user to hold or otherwise contact and interact at least at particular regions of the device while concurrently viewing content displayed on a display screen that covers substantially the entire width and length of the device.

Figure 6A:
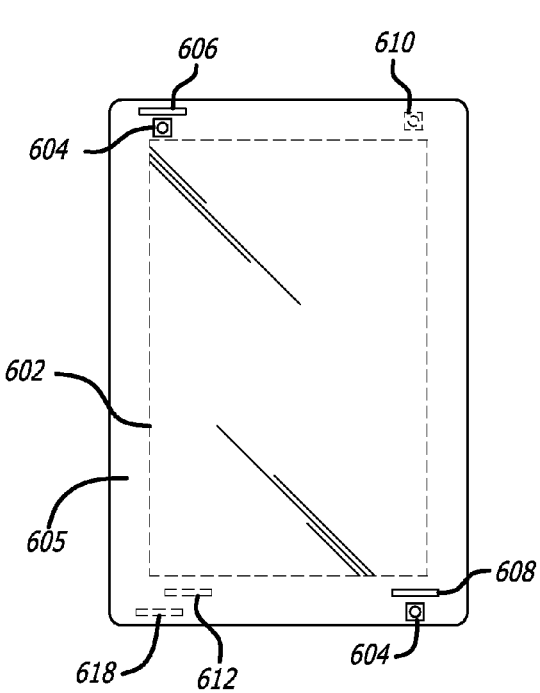
FIGS. 6A, 6B, and 6C illustrates an example device that can be used to implement aspects of the various embodiments.
Figure 6B:
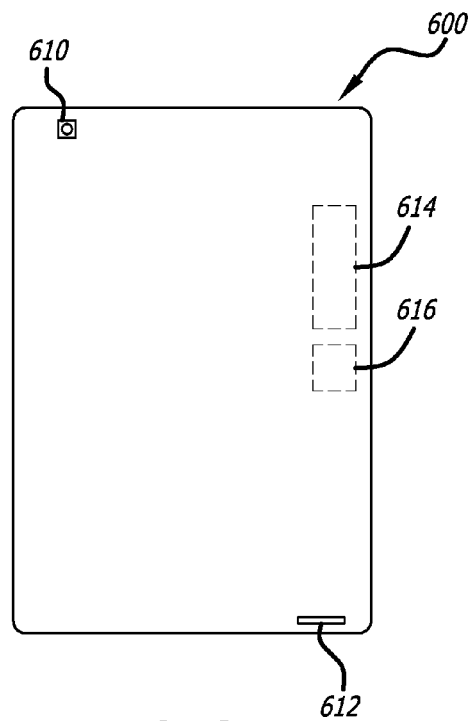

FIGS. 6A and 6B illustrate front and back views of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen (e.g., an LCD element) operable to display information or image content to one or more users or viewers of the device. The display screen of some embodiments displays information to the viewers facing the display screen (e.g., on the same side of the computing device as the display screen). The display screen is separated into a primary display region 602 and a virtual bezel region 605, where both regions are configured to display content. As described, the display screen can include the virtual bezel region of the display screen that extends along, or proximate to, one or more edges of the display screen to approximate the appearance of a physical bezel (or physical border or housing) of the computing device. The virtual bezel region surrounds the primary display region that is configured to display image content, while by default the virtual bezel region may be configured to display no content, or at least no active content, in order to approximate the appearance of a physical bezel. The virtual bezel can be configured to exhibit characteristics similar to that of the physical bezel. For example, the virtual bezel region can be configured to operate as a 'dead zone', where touch-based input is deactivated. The virtual bezel region can also be configured to display at least a portion of any content displayed in the display region and/or one or more notifications. In accordance with various embodiments, in response to changes in the relative position, direction, and/or orientation between the viewer and device, content can be displayed in different regions and/or be adjusted based at least in part to adjust a scale and a translation for the content.

The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display screen of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 6C:
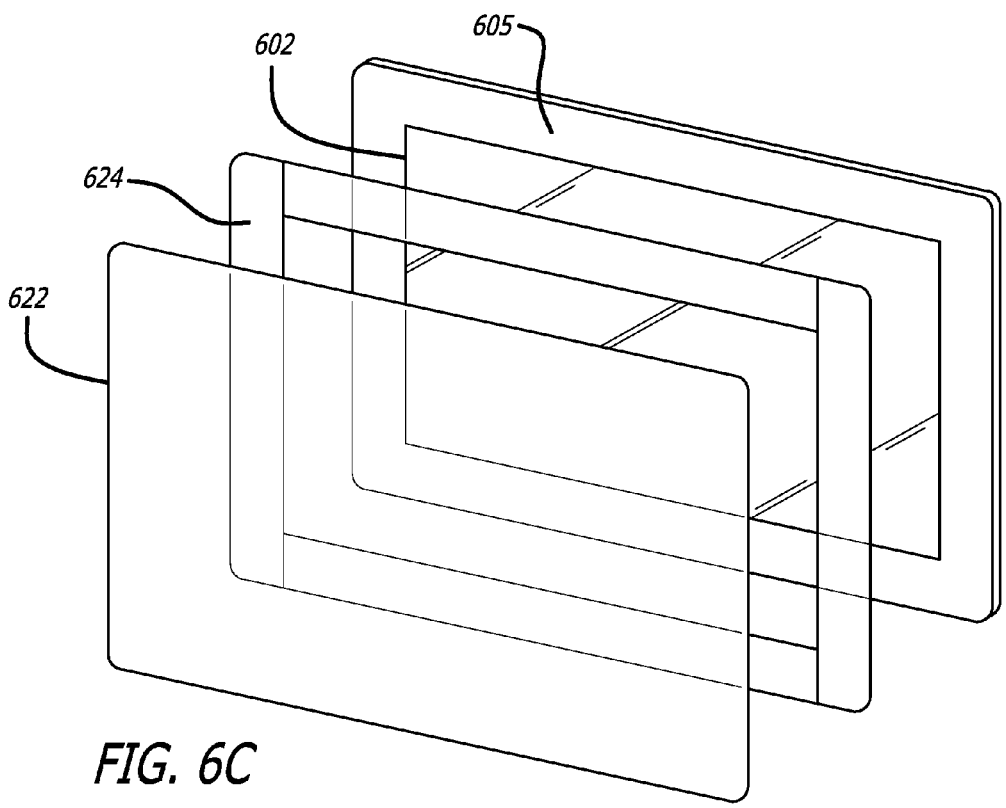

FIG. 6C illustrates different regions of a display screen in accordance with various embodiments. The display screen is separated into a primary display region 602 and a virtual bezel region 605, where both regions are configured to display content. The display region can correspond to a first electroluminescent layer 622 that covers or otherwise includes the full display screen area (i.e., the primary screen and bezel area). The display region can, for example, be configured to display content and/or receive touch-based input.

In accordance with an embodiment, the bezel region can correspond to a second electroluminescent layer 624. The electroluminescent layer can include, for example, individual stripes, sections, or regions that cover the bezel region. As shown in FIG. 6C, the bezel region 624 includes four regions. It should be noted that the bezel region can include more or fewer regions than shown, and the number and placement of regions is merely is to illustrates embodiments described herein.

As described, the regions can be configured to display content and/or receive touch-based input. The virtual bezel region 624 of the display screen can extend along, or proximate to, one or more edges of the display screen to approximate the appearance of a physical bezel (or physical border or housing) of the computing device. The virtual bezel region surrounds the primary display region that is configured to display image content, while by default the virtual bezel region may be configured to display no content, or at least no active content, in order to approximate the appearance of a physical bezel. The virtual bezel can be configured to exhibit characteristics similar to that of the physical bezel. For example, the virtual bezel region can be configured to operate as a 'dead zone', where touch-based input is deactivated. The virtual bezel region can also be configured to display at least a portion of any content displayed in the display region and/or one or more notifications.

For example, in the situation where display screen is powered off or in a lower powered mode, a notification can be displayed in one of the bezel regions. This can include, for example causing one of the bezel regions to be illuminated. For example, in accordance with various embodiments, the full screen can use a backlight panel that is translucent, or otherwise allows light through, such as electroluminescent material. Each rectangular breakout zone can have an additional backlight panel behind the primary one. To display a notification while the screen is otherwise off, the small bezel backlight turns on, and the display screen pixels display the desired content. This backlight is visible through the currently-off full backlight. The display screen's brightness can be adjustable as many include display the notification at a brightness that is at least a proportion of the maximum brightness of the display screen. In the situation where user wants to turn on the whole screen, the full-panel backlight turns on, and the underlay bezel backlights turn off so that there is consistent lighting across the whole display screen. In accordance with an embodiment, the bezel and full backlight panels can be non-overlapping, which can enhance the separation between the primary display region and bezel display region.

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display screen 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display screen of the phone to temporarily shut off (since the user cannot see the display screen while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display screen and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user may either be looking at the device, holding the device or have the device out in the light in order to activate certain functionality of the device. In other embodiments, the device may include a display screen that can operate in different modes, such as reflective (for bright situations) and emissive (for dark situations). Based on the detected light, the device may change modes.

Based on input received at the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display screen and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display screen may likewise tilt to keep the content in orientation with the user.

Various approaches can be utilized for locating one or more desired features of a user's face to determine various aspects useful for determining relative orientation. For example, an image can be analyzed to determine the approximate location and size of a user's head or face. FIG. 8A illustrates an example wherein the approximate position and area of a user's head or face 800 is determined and a virtual "box" 802 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 804 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Various other algorithms can be used to determine the location of features on a user's face. For example, FIG. 8B illustrates an example wherein various features on a user's face are identified and assigned a point location 806 in the image. The system thus can detect various aspects of user features and can determine more subtle changes in orientation. Such an approach provides advantages over the general approach of FIG. 8A in certain situations, as various other features can be determined, in case the user's eyes cannot be seen due to glasses, hair, etc.

Figure 8C:
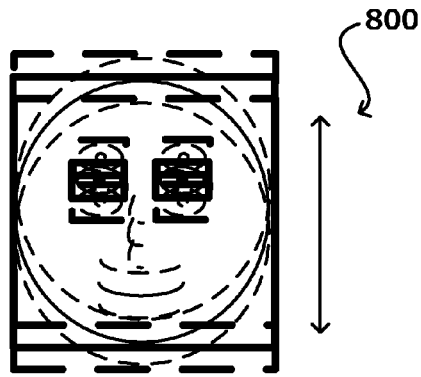
Figure 8D:
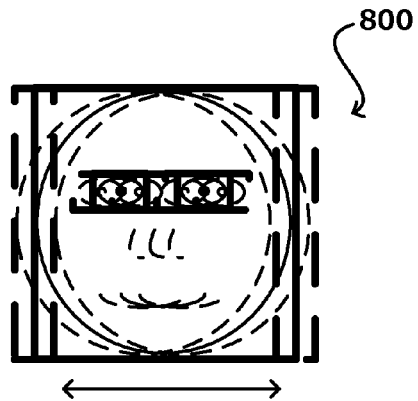
Figure 8E:
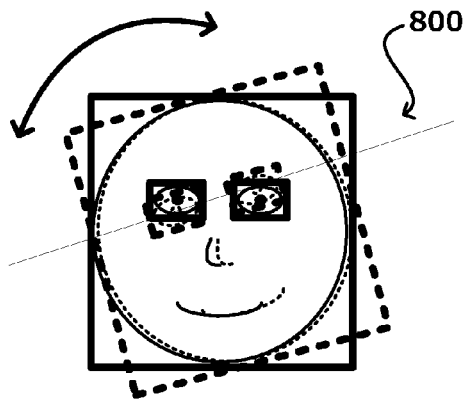
Figure 8F:
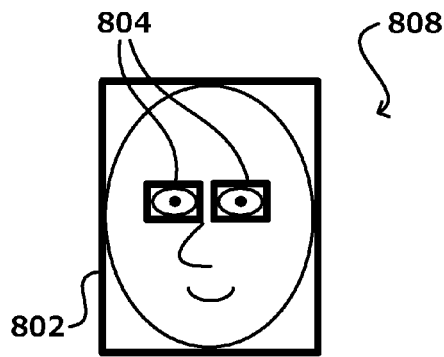

Once the positions of facial features of a user are identified, relative motion between the user and the device can be detected and utilized as input. For example, FIG. 8C illustrates an example where the user's head 800 is moving up and down with respect to the viewable area of the imaging element. As discussed, this could be the result of the user moving his or her head, or the user moving the device up and down, etc. FIG. 8D illustrates a similar example wherein the user is moving right to left relative to the device, through movement of the user, the device, or both. As can be seen, each movement can be tracked as a vertical or horizontal movement, respectively, and each can be treated differently as an input to modify a displayed image. As should be understood, such a process also can detect diagonal or other such movements. FIG. 8E further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input. FIG. 8F illustrates another advantage of using an approach such as that described with respect to FIG. 8B to determine the position of various features on a user's face. In this exaggerated example, it can be seen that the features of a second user's head 808 have a different relative position and separation. Thus, the device also can not only determine positions of features for a user, but can distinguish between different users.

Figure 9A:
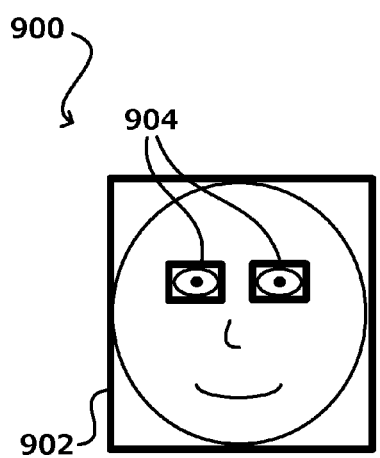
FIGS. 9A and 9B illustrate example approaches to determining changes in the relative distance to a user in accordance with various embodiments
Figure 9B:
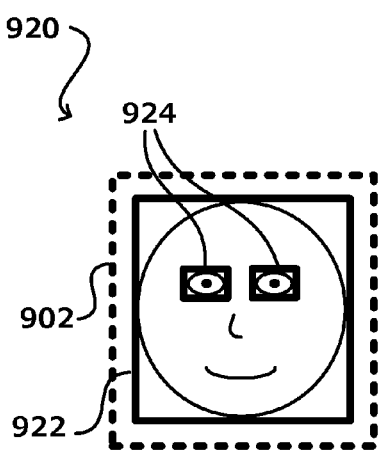

FIGS. 9A and 9B illustrate an example approach that can be used to determine variations in relative distance between a user and a device that can be used in accordance with various embodiments. As in FIG. 8A, the approximate position and area of a user's head or face 900 is determined and a virtual "box" 902 is placed around the face at an initial distance as an indication of distance using one of a plurality of image analysis algorithms for making such a determination. If the user is known, the size of the user's head might be stored such that an actual distance to the user can be calculated based at least in part upon the size of the box 902. If the user is not known, the distance can be estimated or determined using other factors, such as stereoscopic imaging or based on one or more others features such as the placement and/or position of the user's eye, as is indicated by virtual boxes 904. In some embodiments, determinations will be relative with respect to an initial box size when the actual distance cannot be determined As the distance between the user and the device changes, the size of the virtual box will change as well. For example, in FIG. 9B the distance between the user and the device has increased, such that the user's head 920 appears smaller in the captured image information. Accordingly, the size of the virtual box 922 for the adjusted size of the user's head is smaller than the original box 902 for the initial distance. By monitoring adjustments in the size of the box or another measure of the user's head and/or other such features (e.g., boxes 924), the device can determine an approximate distance and/or change in distance to the user. As discussed, this information can be used to adjust aspects of the displayed image information such as a level of zoom or amount of detail.

Figure 10A:
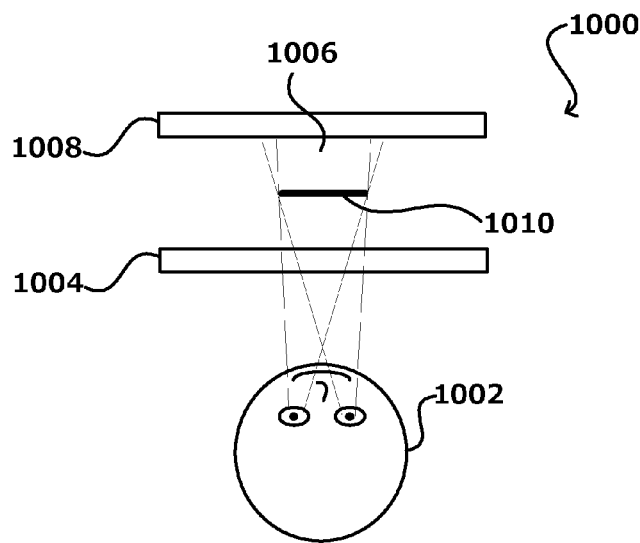
FIGS. 10A, 10B, 10C, and 10D illustrate example approaches to determining changes in the relative viewing angle for a user in accordance with various embodiments.
Figure 10B:
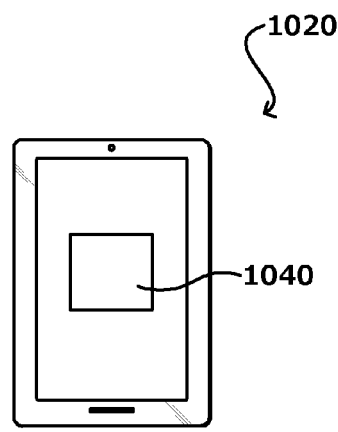
Figure 10C:
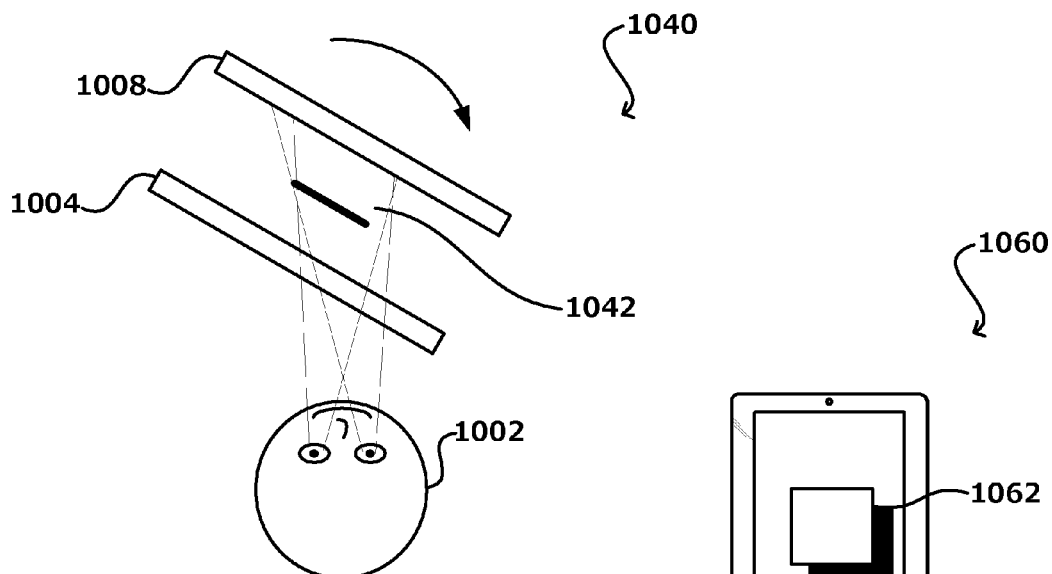
Figure 10D:
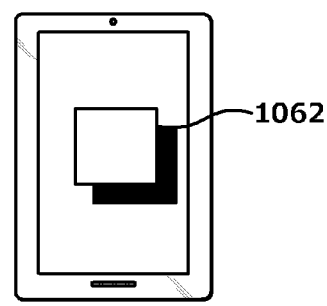

FIGS. 10A to 10D illustrate an example of how an interface plane or element at different depths can be used to generate viewing-angle appropriate images in accordance with at least some embodiments. In FIG. 10A, the example orientation 1000 has a user 1002 substantially in front of a display screen 1004 of a device. For simplicity of explanation, the interface plane or element here is represented in three dimensions, with a box 1006 on a background 1008. At the current viewing angle, the user is only able to see the top surface 1010 of the interface plane or element 1006, as illustrated in the display view 1020 of FIG. 10B. In the orientation 1040 of FIG. 10C, the device has been rotated (or the user has moved with respect to the device). To provide an appropriate user experience in at least some embodiments, the interface plane or element is effectively rotated with the device, such that the interface plane or element and background 1008 would rotate accordingly. Based on the current viewing direction of the user 1002, it can be seen in the display view 1060 of FIG. 10D that the viewable portion 1062 of the interface plane or element includes not only the top of the interface plane or element but at a level of depth (i.e., the interface plane appears to be closer to a display screen of the device). By calculating this angle, the application can determine the portions of the top and side of the interface plane or element to display as a result of the rotation. It also can be seen in FIG. 10C that any area occluded by the right side of the interface plane or element in FIG. 10A now can be seen, and that the area occluded by the left side of the box is interface plane or element greater in FIG. 10C.

Figure 11A:
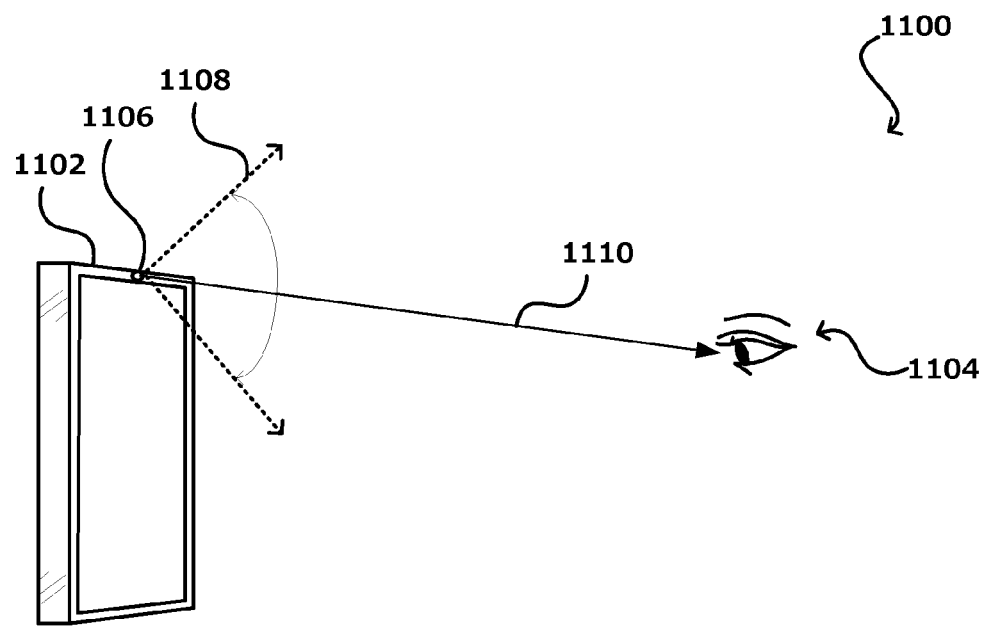
FIGS. 11A and 11B illustrate an example approach to determining the relative position of a user that can be utilized in accordance with various embodiments

In at least some embodiments, a computing device can utilize one or more cameras or other such sensors to determine the relative direction of the user. For example, FIG. 11A illustrates an example situation 1100 wherein a computing device 1102 is configured to utilize at least one camera element 1106 to attempt to locate a feature of a user, such as the user's head or eyes, for purposes of point of view determination. In this example, the user's eyes 1104 are located within the field of view 1108 of a camera of the computing device 1102. As discussed elsewhere herein, however, the point of view of a user can be determined using positions of the user's eyes, pupils, head, or other such features that can be indicative of at least a general point of view. In some embodiments, the device might look for an object held by or otherwise associated with a user to determine a general point of view for rendering. Further, in some embodiments a device might utilize at least two different cameras positioned on the device with a sufficient separation such that the device can utilize stereoscopic imaging (or anther such approach) to determine a relative position of one or more features, with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 1110 of at least one of the user's eyes with respect to the camera. In many embodiments, direction information will be sufficient to provide adequate point-of-view dependent rendering. In at least some embodiments, however, it can also be desirable to determine distance to the user in order to provide a more consistent and accurate rendering. In some embodiments, methods such as ultrasonic detection, feature size analysis, luminance analysis through active illumination, or other such distance measurement approaches can be used to assist with position determination. In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature as known for disparity mapping and other such processes.

Figure 11B:
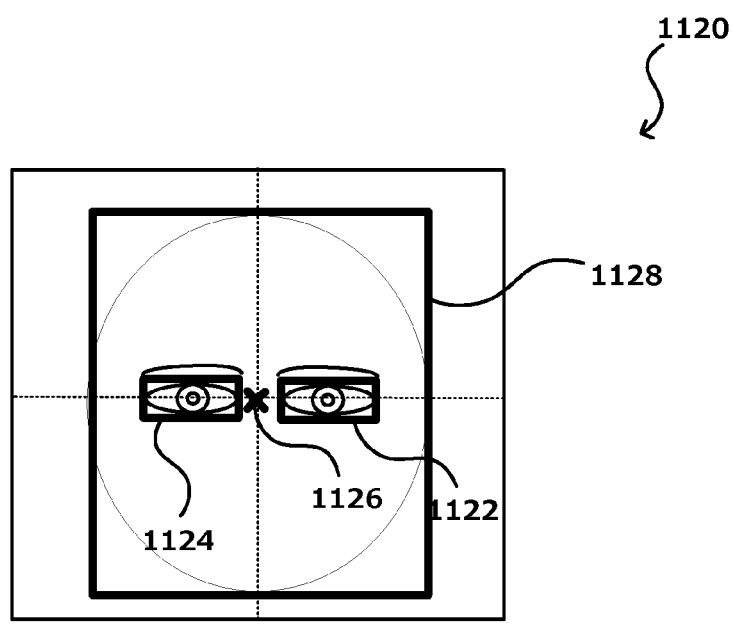

Further illustrating such an example approach, FIG. 11B illustrates an example image 1120 that could be captured of the user's head and eyes using the camera 1106 of FIG. 11A. One or more image analysis algorithms can be used to analyze the image to perform pattern recognition, shape recognition, or another such process to identify a feature of interest, such as the user's eyes. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. As illustrated in this example, both eyes of the user might be able to be located in the captured image information. At least some algorithms are able to determine an approximate location or region 1122, 1124 for each eye, or at least an approximate location 1128 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 1126 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user, with that relative direction being used for the point of view to use in rendering the interface.

When using a camera to track location, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. In some embodiments, a sensor or other such element of a computing device can be used to determine motions of the computing device, which can help adjust point of view determinations. The sensors can be any appropriate sensors capable of providing information about rotations and/or translations of the device, as may include accelerometers, inertial sensors, electronic gyroscopes, electronic compasses, and the like.

Figure 12A:
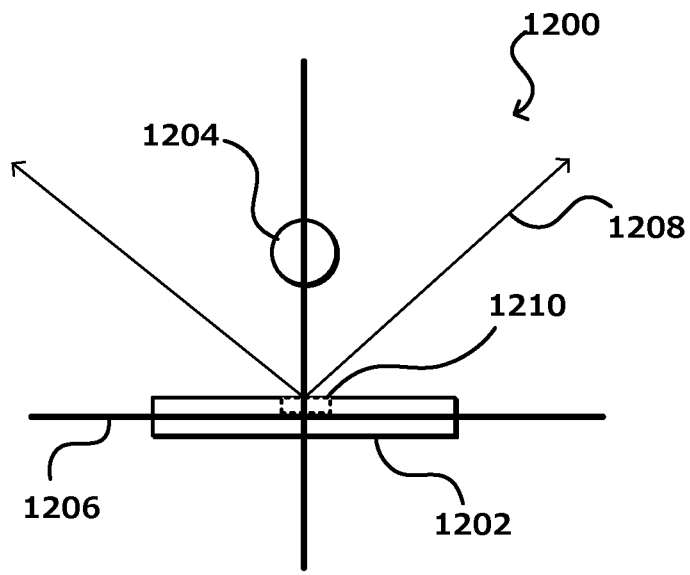
FIGS. 12A and 12B illustrate an example approach to determining device motion that can be utilized in accordance with various embodiments.

For example, FIG. 12A illustrates a "top view" 1200 of a computing device 1202 operable to capture an image of an object 1204 (e.g., a user's head) within an angular view 1208 of a camera 1210 of the computing device. In this example, the computing device 1202 includes at least one orientation- or rotation-determining element, such as an electronic compass or electronic gyroscope, that is able to determine a frame of reference 1206 in two or three dimensions with respect to a first orientation of the device. In at least some embodiments, an electronic compass might be used to determine an axis of the frame of reference 1206, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 1206 or orientation can be determined at or near the time of capture of a first image by a camera 1210 of the computing device 1202. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 12B:
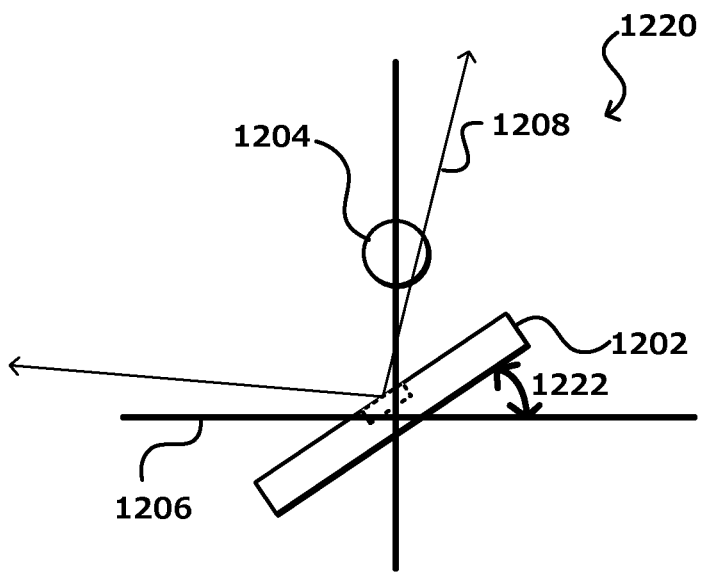

FIG. 12B illustrates a second top view 1210 after a change in orientation of the computing device 1202. The electronic gyroscope (or other such component or embedded sensor) can detect the change in orientation, in this example corresponding to a change in angle 1222 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 1222 about a single axis. As illustrated, this causes the object 1204 to be moved to the right edge of the field of view 1208 of the camera 1210. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

Figure 13:
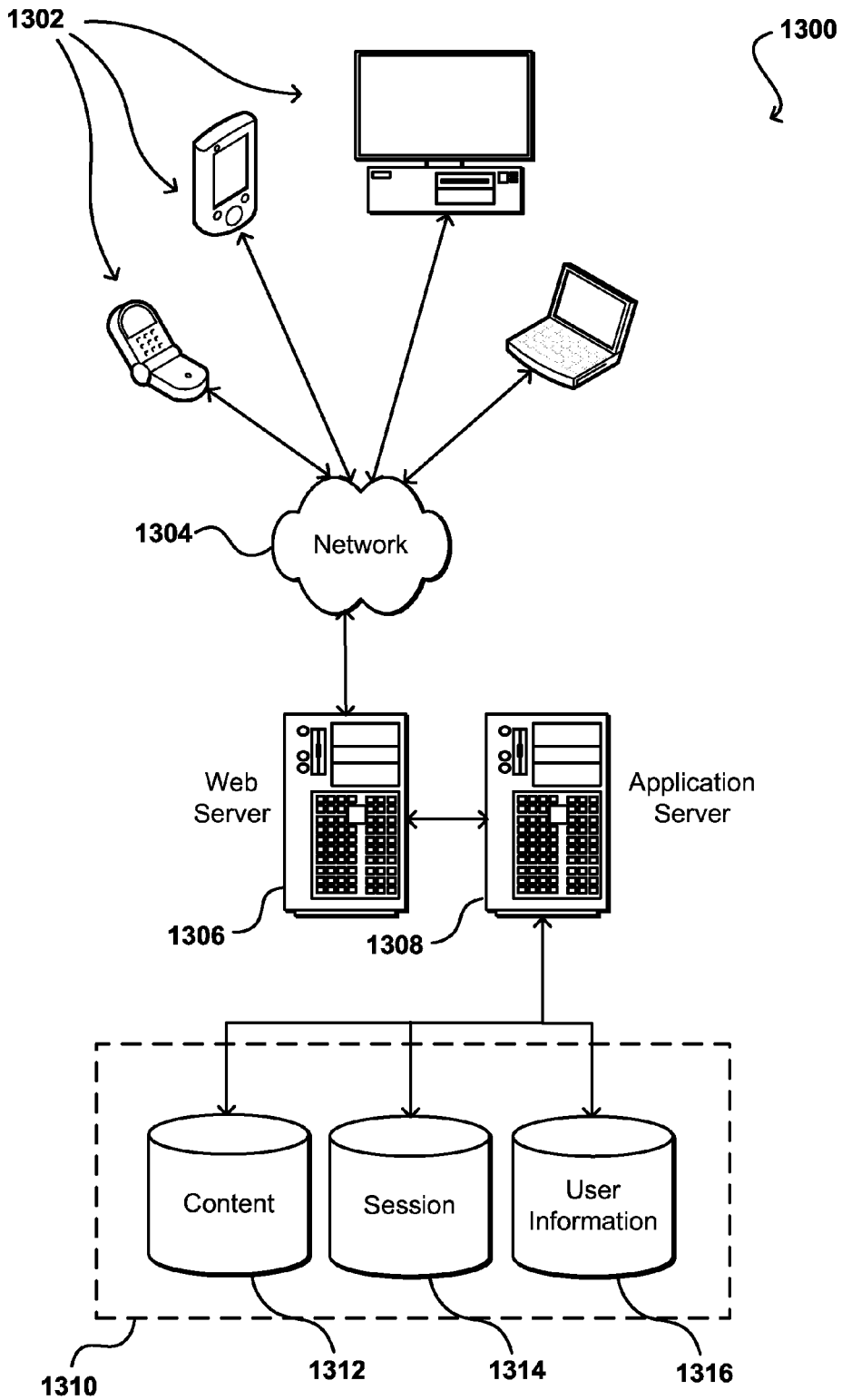
FIG. 13 illustrates an environment in which various embodiments can be implemented.

As discussed, different approaches can be implemented in various environments in accordance with the described embodiments. For example, FIG. 13 illustrates an example of an environment 1300 for implementing aspects in accordance with various embodiments. As will be appreciated, although a Web-based environment is used for purposes of explanation, different environments may be used, as appropriate, to implement various embodiments. The system includes electronic client devices 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1306 for receiving requests and serving content in response thereto, although for other networks, an alternative device serving a similar purpose could be used, as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1306 in the form of HTML, XML or another appropriate structured language in this example. The handling of all requests and responses, as well as the delivery of content between the client devices 1302 and the application server 1308, can be handled by the Web server 1306. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing content (e.g., production data) 1312 and user information 1316, which can be used to serve content for the production side. The data store is also shown to include a mechanism for storing log or session data 1314. It should be understood that there can be other information that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1302. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a display screen;
   a camera;
   at least one processor; and
   memory including instructions that, when executed by the at least one processor, cause the computer device to:
   acquire, using the camera, an image of a viewer of the computing device;
   determine, by analyzing the image, a first location of the viewer with respect to the computing device;
   display a first graphical representation of a content in a primary display region of the display screen, the first graphical representation being displayed to correspond to the first location of the viewer and having a first lateral offset and a first depth position relative to a surface of the display screen, a virtual bezel region surrounding the primary display region;
   detect, using an orientation determining element of the computing device, a change in orientation of the computing device;
   determine, based at least in part on the change in orientation, a second location of the viewer with respect to the computing device;
   determine a second lateral offset for the content based at least in part upon the second location of the viewer relative to the computing device; and
   display a second graphical representation of the content on the display screen, wherein at least a portion of the content is shifted from a first lateral position to a second lateral position by an amount equal to a difference between the first lateral offset and the second lateral offset, the portion of the content being displayed on the virtual bezel region at least at the first depth position.

2. The computing device of claim 1, wherein the instructions, when executed to determine the first location of the viewer, further enable the computing device to:
   locate a representation of the viewer in the image captured by the camera; and
   determine the first location based at least in part upon a position of the representation of the viewer in the image, an angular field of view of the camera, and a zoom level at which the image is acquired.

3. The computing device of claim 1, wherein the instructions, when executed to display the second graphical representation of the content, further enable the computing device to:
   utilize a three-dimensional representation of the content, at least a portion of the three-dimensional representation being rendered in the virtual bezel region.

4. The computing device of claim 1, wherein the instructions, when executed to render the second graphical representation of the content for display, further enable the computing device to:
   update at least one of a rendering or a shadowing of a three-dimensional representation of the content based at least in part upon at least one of a change in a relative viewpoint, a change in an orientation, or a change in a relative location of at least one virtual light source; and
   display at least a portion of the three-dimensional representation of the content in the virtual bezel region.

5. A computer implemented method, comprising:
   displaying content that includes a plurality of graphical elements on a primary display region of a display screen of a computing device, a bezel region configured to surround the primary display region, the bezel region configured to display one of additional content or at least a portion of the content displayed on the primary display region;
   detecting a presentation event;
   assigning a first graphical element of the plurality of graphical elements to a first depth position;
   assigning a second graphical element of the plurality of graphical elements to a second depth position, the first depth position being different from the second depth position;

detecting, in response to the presentation event using an orientation determining element of the computing device, a change in orientation of the computing device; and displaying one of the first graphical element or the second graphical element in the bezel region based at least in part upon the first depth position for the first graphical element, the second depth position for the second graphical element, and a location of a viewer relative to the computing device.

6. The computer implemented method of claim 5, wherein the presentation event includes at least one of a change in orientation of the computing device, an operating system event, or an application event, the operating system event and the application event causing content to be displayed in the bezel region.

7. The computer implemented method of claim 5, wherein the content includes a plurality of graphical elements, and wherein displaying the content further includes:
rendering at least a portion of the plurality of graphical elements to appear closer to a viewer of the display screen relative to at least one graphical element of the plurality of graphical elements.

8. The computer implemented method of claim 5, wherein the presentation event corresponds to a notification, and wherein the method further includes:
displaying at least one of a notification, a user-selectable element, or advertisement in the bezel region.

9. The computer implemented method of claim 5, wherein touched-input is deactivated for the bezel region, and wherein touch-based input is active for at least a portion of the primary display region.

10. The computer implemented method of claim 5, further including:
adjusting an appearance of at least a portion of the content according to the location of the viewer or in response to the presentation event,
wherein adjusting the appearance of the at least a portion of the content includes adjusting at least one of a size, shape, color, shading, or blur of the content according to at least one of the location of the viewer or the presentation event, the adjusting causing the at least a portion of the content to be displayed in the bezel region.

11. The computer implemented method of claim 5, wherein displaying the content includes displaying a three-dimensional representation of at least a portion of the content, the method further comprising:
displaying a portion of the three-dimensional representation of the content in the bezel region.

12. The computer implemented method of claim 5, wherein the presentation event corresponds to a notification event configured to cause a notification to be displayed on the display screen, the method further comprising:
displaying the notification in the bezel region, the notification corresponding to at least one an email notification, an text message notification, a phone call notification, or an advertisement.

13. The computer implemented method of claim 5, wherein displaying the portion of the content includes displaying at least one of first shadowing in the bezel region based at least in part upon an intersection of the content and light from at least one light source near the computing device, or second shadowing in the primary display region based at least in part upon an intersection of a portion of the bezel region and light from at least one light source,
wherein the at least one light source includes at least one of a virtual light source or a physical light.

14. The computer implemented method of claim 5, wherein the content includes a plurality of graphical elements, and wherein displaying the portion of the content further includes:
detecting, using an orientation determining element of the computing device, a change in orientation of the computing device; and
adjusting a scale and a translation for a respective graphical element of the plurality of graphical elements based at least in part on the change in orientation of the computing device and a depth position of each graphical element of the plurality of graphical elements relative to the display screen.

15. The computer implemented method of claim 14, further comprising:
detecting a change in orientation of the computing device;
shifting from a first lateral position to a second lateral position at least a portion of the plurality of graphical elements based at least in part on the change in orientation of the computing device; and
displaying the portion of the plurality of graphical elements in the bezel region.

16. A non-transitory computer-readable storage medium including instructions that, when executed by at least one processor of a computing system, cause the computing system to:
determine a bezel region on a display screen of a computing device, a primary display region being surrounded by the bezel region;
display content that includes a plurality of graphical elements on the primary display region, the bezel region configured to display one of additional content or at least a portion of the content displayed on the primary display region;
detect a presentation event;
assign a first graphical element of the plurality of graphical elements to a first depth position;
assign a second graphical element of the plurality of graphical elements to a second depth position, the first depth position being different from the second depth position;
detect, in response to the presentation event using an orientation determining element of the computing device, a change in orientation of the computing device; and
display one of the first graphical element or the second graphical element in the bezel region based at least in part upon the first depth position for the first graphical element, the second depth position for the second graphical element, and a location of a viewer relative to the computing device.

17. The computing device of claim 16, the instructions further being configured to cause the computing system to:
activate touch-based input on the bezel region;
detect a touch-based input selection on the bezel region; and
cause the computing device to perform at least one operation.

18. The computing device of claim 16, wherein the additional content includes at least one of a notification, a user-selectable element, or advertisement the instructions further being configured to cause the computing system to:
display at least one of the notification, the user-selectable element, or an advertisement on the bezel region when the display screen is in one of a powered off state or lower powered state.

19. The computing device of claim 18, wherein the bezel region of the display screen extends along one or more edges of the display screen to approximate an appearance of a physical bezel of the computing device.

\* \* \* \* \*